United States Patent
Meulendijks et al.

(10) Patent No.: US 12,201,120 B2
(45) Date of Patent: Jan. 21, 2025

(54) MOVABLE MOULD MEMBER FOR MOULDING FOOD PRODUCTS

(71) Applicant: MAREL FURTHER PROCESSING B.V., Boxmeer (NL)

(72) Inventors: Johannes Martinus Meulendijks, Deurne (NL); Thomas Willem Dekker, Nijmegen (NL); Erik Hendrikus Werner Peters, Boxmeer (NL); Martinus Johannes Willebrordus Van Zoelen, 's-Hertogenbosch (NL); Jacques Le Paih, Baud (FR)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 690 days.

(21) Appl. No.: 17/430,902

(22) PCT Filed: Feb. 17, 2020

(86) PCT No.: PCT/NL2020/050090
§ 371 (c)(1),
(2) Date: Aug. 13, 2021

(87) PCT Pub. No.: WO2020/171697
PCT Pub. Date: Aug. 7, 2020

(65) Prior Publication Data
US 2022/0079173 A1     Mar. 17, 2022

(30) Foreign Application Priority Data
Feb. 19, 2019   (NL) .................................... 2022602

(51) Int. Cl.
*A23C 7/00*      (2006.01)
*A22C 7/00*      (2006.01)
*A23P 30/10*     (2016.01)

(52) U.S. Cl.
CPC .......... *A22C 7/0069* (2013.01); *A22C 7/0038* (2013.01); *A23P 30/10* (2016.08)

(58) Field of Classification Search
CPC ...... A22C 7/0038; A22C 7/0069; A23P 30/10
See application file for complete search history.

(56) References Cited

U.S. PATENT DOCUMENTS 4,418,446 A    12/1983  Sandberg et al.
4,957,425 A     9/1990  Fay
(Continued)

FOREIGN PATENT DOCUMENTS

WO         0030458 A1    6/2000
WO      2004002229 A2    1/2004
(Continued)

OTHER PUBLICATIONS

Search Report and Written Opinion from corresponding Dutch Application No. 2022602, Nov. 6, 2019.
(Continued)

*Primary Examiner* — Anthony J Weier
(74) *Attorney, Agent, or Firm* — Workman Nydegger

(57) ABSTRACT

A moveable mould member is configured for use in an installation for moulding food products from a pumpable foodstuff mass. The mould member has a permeable mould body with an outer surface forming at least part of the outer mould member surface, which outer surface of the permeable mould body is fluid tight; mould cavities and a permeable volume defining fine openings opening out at the mould cavities, such that each mould cavity of the permeable mould body is delimited at least in part by a permeable volume. In addition, the mould drum has, for each group of mould cavities from which food products are to be ejected simultaneously, an ejection fluid inlet allowing the entry of pressurized fluid, and one or more channels extending from
(Continued)

the associated ejection fluid inlet to the one or more permeable volumes of the group of mould cavities.

5 Claims, 15 Drawing Sheets

(56) References Cited

U.S. PATENT DOCUMENTS

| | | | | |
|---|---|---|---|---|
| 9,635,886 | B2* | 5/2017 | Tu | A24F 40/51 |
| 9,737,080 | B2* | 8/2017 | Meulendijks | A22C 7/0069 |
| 10,028,515 | B2* | 7/2018 | Boom | A23P 30/10 |
| 10,506,815 | B2* | 12/2019 | Meulendijks | A22C 7/0076 |
| 10,631,565 | B2* | 4/2020 | Meulendijks | A22C 7/0038 |
| 10,638,764 | B2* | 5/2020 | Lok | A22C 7/0076 |
| 11,246,317 | B2* | 2/2022 | Verouden | A23P 30/10 |
| 11,412,745 | B2* | 8/2022 | Dunnewind | A22C 7/0069 |
| 11,653,657 | B2* | 5/2023 | Le Paih | A22C 7/0076 |
| | | | | 426/512 |
| 2012/0058213 | A1* | 3/2012 | Lindee | A22C 7/0038 |
| | | | | 425/135 |
| 2013/0045294 | A1* | 2/2013 | Van Gerwen | A22C 7/0069 |
| | | | | 425/363 |
| 2013/0273192 | A1* | 10/2013 | Van Gerwen | B08B 9/00 |
| | | | | 425/317 |
| 2014/0212558 | A1* | 7/2014 | Spierts | A22C 11/08 |
| | | | | 426/519 |
| 2015/0208716 | A1* | 7/2015 | Schmid | A23P 30/10 |
| | | | | 425/149 |

FOREIGN PATENT DOCUMENTS

| | | | | |
|---|---|---|---|---|
| WO | 2012012581 | A1 | 1/2012 | |
| WO | 2012107236 | A2 | 8/2012 | |
| WO | 2012161577 | A1 | 11/2012 | |
| WO | 2014161947 | A1 | 10/2014 | |
| WO | 2018034568 | A1 | 2/2018 | |
| WO | WO2018099861 | | * 6/2018 | |
| WO | WO-2018099861 | A1 | * 6/2018 | A22C 7/0069 |
| WO | WO2018193046 | | * 10/2018 | |
| WO | WO-2018193046 | A1 | * 10/2018 | A22C 7/0069 |

OTHER PUBLICATIONS

International Search Report and Written Opinion from PCT Application No. PCT/NL2020/050090, Aug. 14, 2020.

* cited by examiner

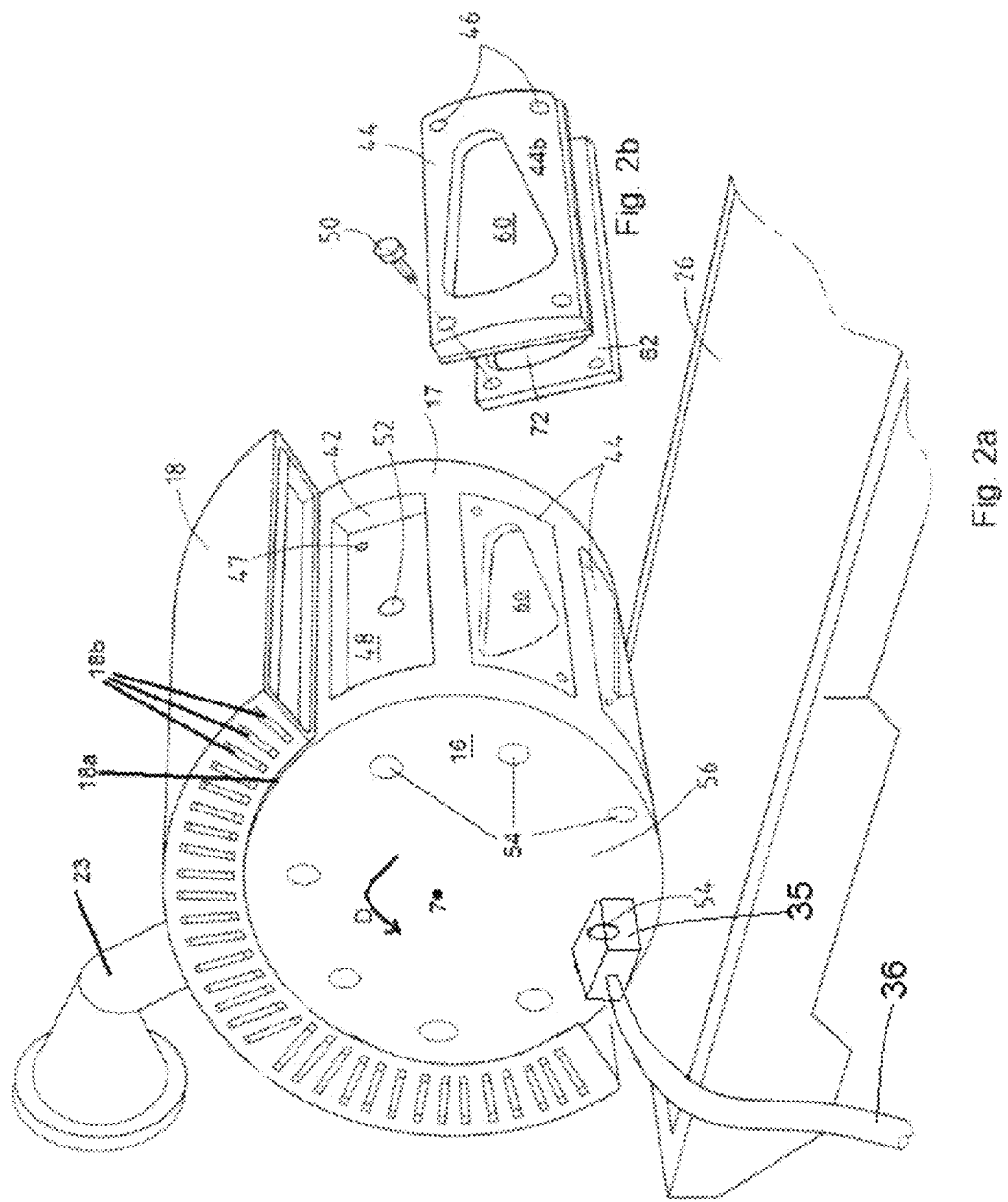

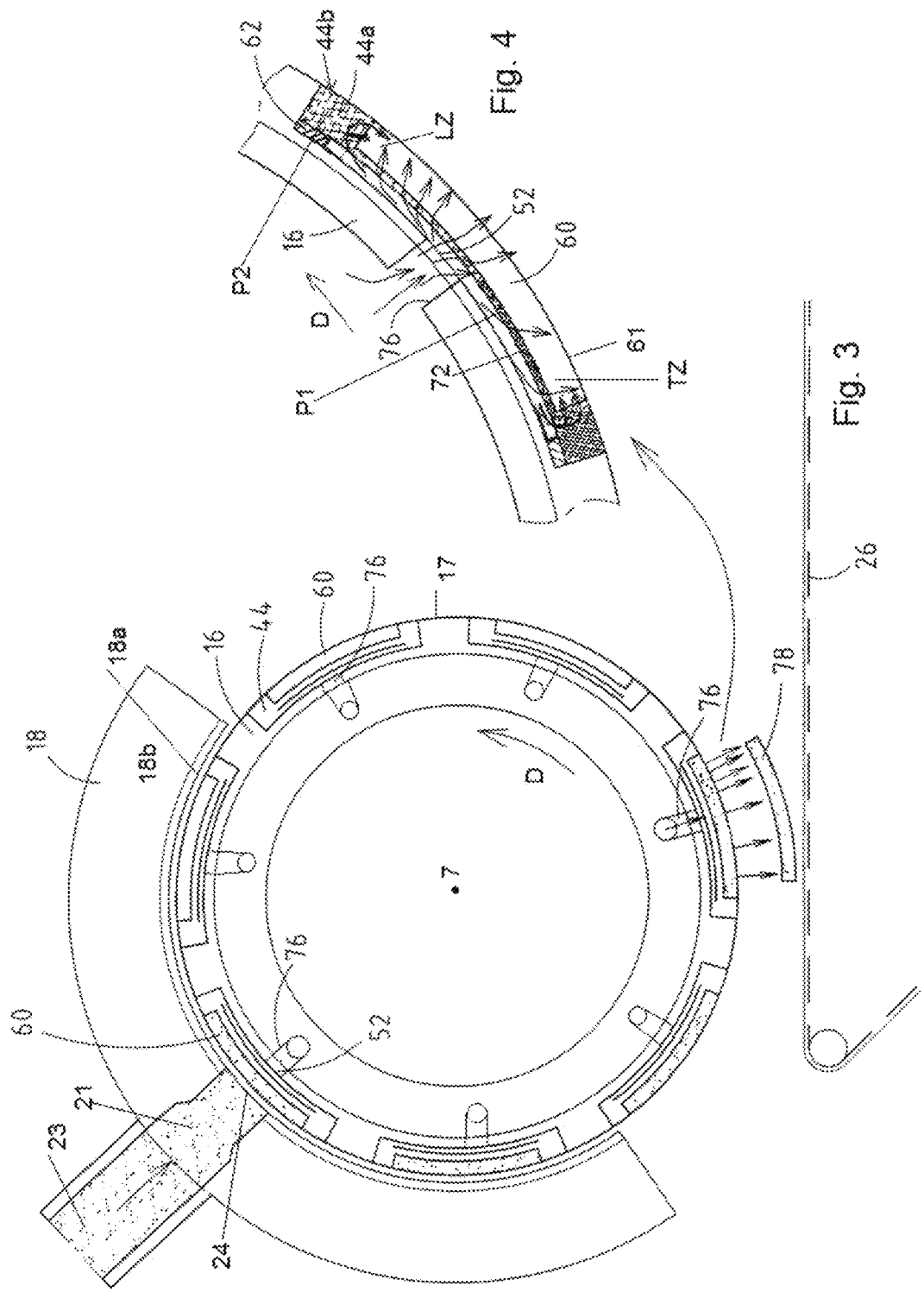

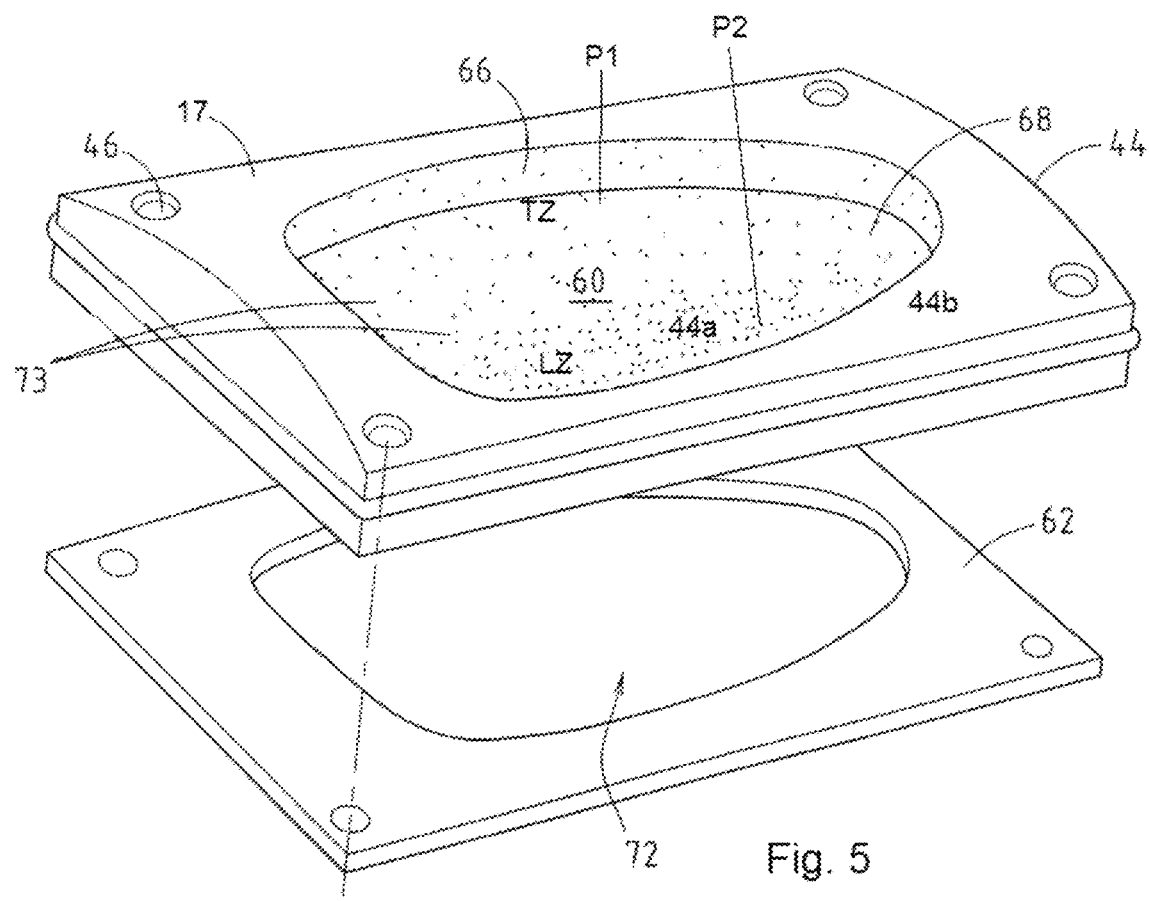
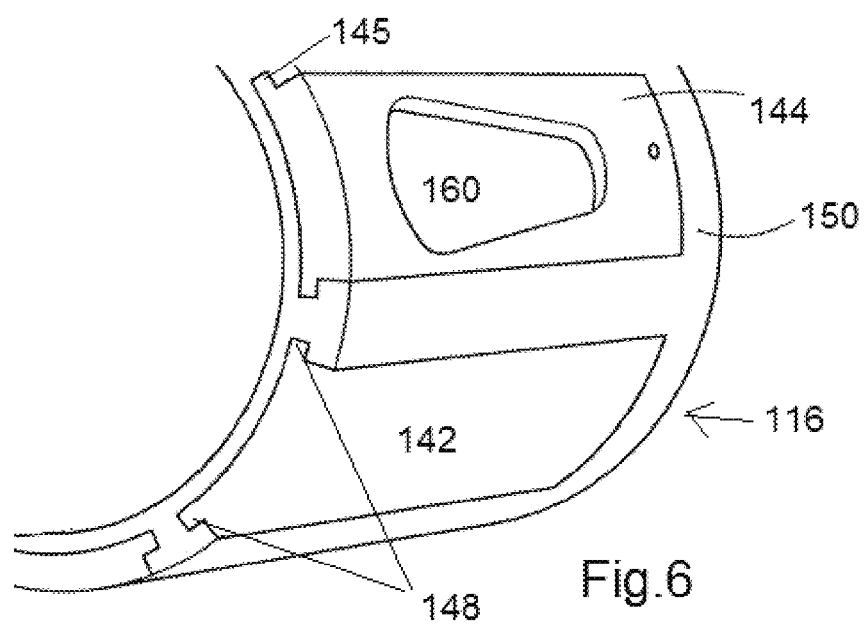

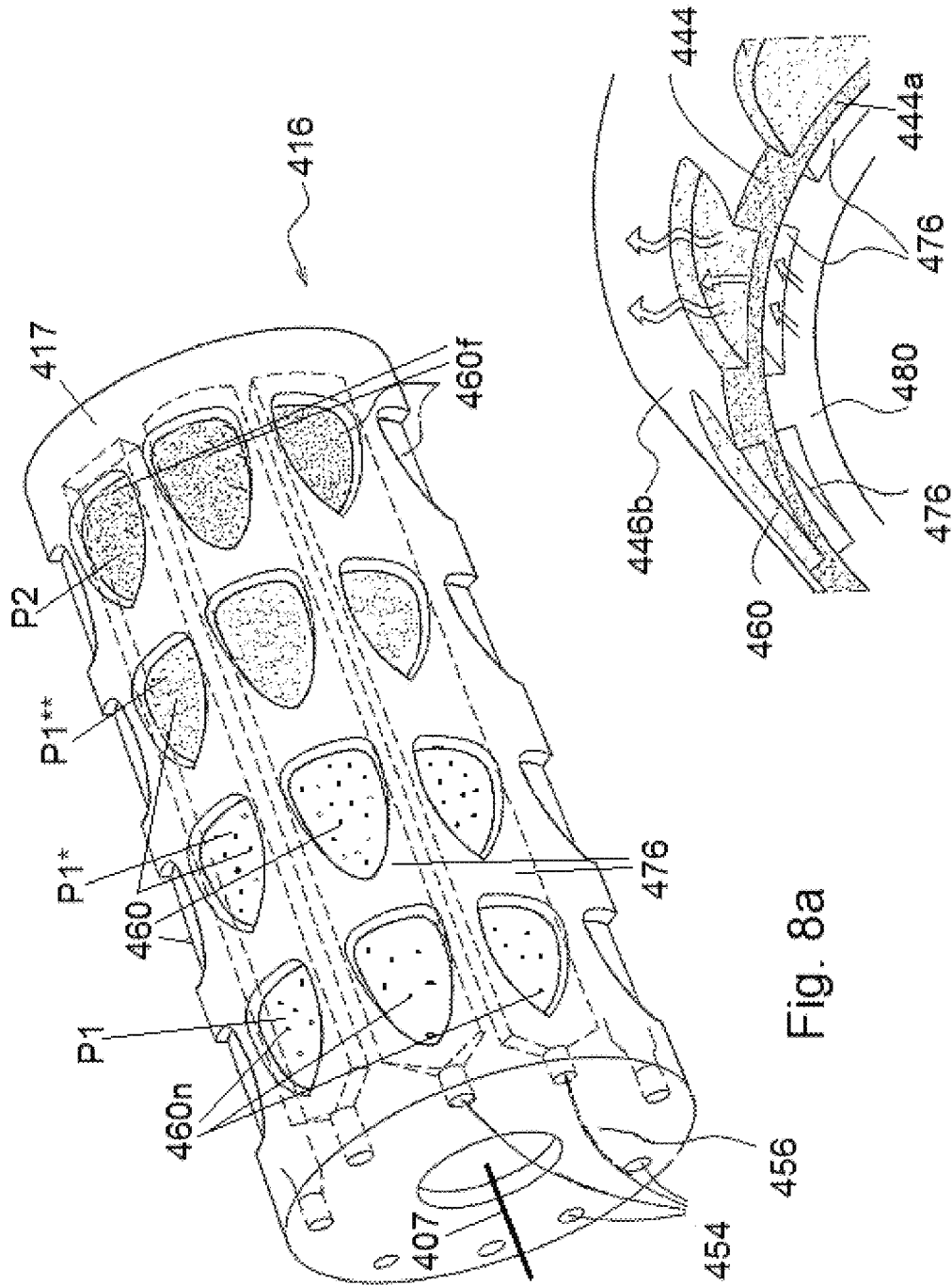

MOVABLE MOULD MEMBER FOR MOULDING FOOD PRODUCTS

BACKGROUND

The present invention relates to the field of moulding of food products using an installation having a moveable mould member. The present invention also relates to manufacturing a mould member for moulding food products.

Movable mould members, and in particular rotary cylindrical mould drums for moulding food products, are well known in the art and have been commercially offered by Marel under the name RevoPortioner for over a decade. Such a rotary cylindrical mould drum is configured for use in a moulding installation for moulding food products from a pumpable foodstuff mass of one or more food starting materials. The cylindrical mould drum member has an outer circumferential drum surface and a longitudinal drum rotation axis. The drum is rotatably supported on the stationary frame of the Revoportioner to revolve about the drum rotation axis in a direction of rotation, which is commonly in horizontal orientation.

The rotary cylindrical mould drum comprises in the drum surface multiple recessed mould cavities, each mould cavity defining a shape of the product which is to be moulded. In embodiments, the shape is that of a disc to mould a circular product, e.g. a meat patty, e.g. hamburgers. Nuggets, e.g. of poultry based starting material, are formed in rather small cavities, e.g. of a more or less rectangular shape. Alternatively, drums having cavities of more irregular shape are known, e.g. to mould products having an irregular circumference and/or an irregular thickness. The products may also be elongated, e.g. like chicken fillets, sausage like products, etc. The mould cavities have an opening in the drum surface for the introduction of foodstuff mass into the mould cavity, and for ejection of the moulded product.

Examples of the products to be moulded with the mould drum of the invention are hamburgers, nuggets, schnitzels and three-dimensional products such as tenderloins, steaks, (meat) balls and fillets. An appropriately designed mould drum can handle different foodstuff masses, such as red and white meat, fish, potato and other plant-based foodstuff masses, but also edible fungi-based masses, soy-based masses and edible insect-based masses and the like. Often the mass is ground, e.g. ground meat.

SUMMARY

In embodiments, both known and according to inventions disclosed herein, the mould cavities are arranged in the outer drum surface in a mould cavities pattern with lanes of cavities. Herein, in a lane, cavities are arranged at multiple longitudinal positions when seen in a longitudinal direction of the mould drum. A lane may be straight, so parallel to the mould drum axis, or helical as is known in the art.

In embodiments, both known and according to inventions disclosed herein, multiple lanes are provided on the drum when seen in circumferential direction. In embodiments, the drum surface may comprise 4, 5, 6, 8, 10, 12 or more lanes of cavities, predominantly depending on the size of the products. In a lane multiple cavities are arranged, e.g. 2, 3, 4, 5, 6, 7, 8 or even more. Obviously, the length of the drum and the size of the cavities impacts the number of cavities in a lane. For example, the drum has a length between 50 and 120 centimetres, e.g. 60, 70, or 100 centimetres.

In general, it is envisaged that in embodiments food products with a thickness between 3 and 40 mm can be produced, in particular between 10 and 30 mm. Product length and/or width, or diameter, may for example vary between 5 and 250 mm, e.g. diameters of between 8 and 15 centimetres, e.g. for hamburger meat patties.

The length of the rotary mould drum in longitudinal direction is in practical embodiments between 400-1000 mm, e. g. 700 mm.

The rotary mould drum further comprises at least one permeable mould body. Such a permeable mould body comprises:
- a curved outer surface forming at least part of the outer circumferential drum surface, which curved outer surface of the permeable mould body is fluid tight;
- one or more of the mould cavities,
- a permeable volume comprising fine openings opening out at the one or more mould cavities, such that each mould cavity of the permeable mould body is delimited at least in part by a permeable volume.

It is conceivable that the mould drum has a single permeable mould body. For example, the mould body has an outer hollow cylinder of permeable structure, e.g. of porous material, e.g. of sintered metal with a porous structure. The outer hollow cylinder is optionally supported by a support member within the hollow cylinder.

Alternatively, the mould drum comprises multiple porous mould bodies. For example, multiple mould bodies are provided on a support member, e.g. on a solid, non-permeable, metal support member, e.g. by any known fastening technique, possibly in a releasable manner.

In an embodiment each mould body comprises one or more lanes of cavities, each lane extending in longitudinal direction, e.g. in a straight line, e.g. the mould body extending over the length of the drum or at least the majority of the length. It is also conceivable that mould bodies are embodied as discs, comprising a circle of multiple cavities.

In an embodiment a permeable mould body comprises only a single mould cavity, or two, or three mould cavities. From the prior art, techniques are known to position or integrate such a permeable mould body into the rotary mould drum.

A permeable mould body is permeable for fluid, in particular for ejection fluid that is used for assisting in the ejection of moulded products from the mould cavities. The permeability serves to allow passage of the ejection fluid through the body to cause the ejection of the product. It is preferred that the fine passages are generally too small, e.g. at least the fine openings thereof in the surface of the mould cavity, for the foodstuff mass to enter significantly into the fine passages during production of the food product.

A permeable mould body can be made from a porous material. For example, the mould body comprises sintered metal, such as stainless steel, aluminium, copper or bronze. It is also conceivable that the permeable mould body comprises one or more polymers. Known sinter powder has a particle size of 100 pm-50μ, which has been sintered. Possible, isostatic pressing and/or coaxial compression is applied to produce a mould body having a permeable volume. Typically, such a product comprises a porosity of 3-30%, preferably between 5-15%.

The porous volume has a porosity typically between 3-30%, advantageously between 5-15%, having fine openings with an effective pore size of 1-50 μm. The fine openings, or minute openings, are generally referred to as 'pores' in relation to a porous volume.

It is also conceivable that a permeable mould body, or at least a mould body component that forms to mould body together with one or more additional mould body components, is made from a solid, non-porous or closed celled, material, e.g. provided in a machining step with fine passages having fine openings that open out in the cavity, for example micropassages or nanopassages.

Possibly, the permeable mould body, or at least a mould body component that forms to mould a body together with one or more additional mould body components, is made using a rapid prototyping technique, e.g. metal or polymer 3D printing. Preferably fine passages of the mould body are formed in the rapid prototyping process, so, as preferred, without requiring a further machining step to form these passages for the ejection fluid. For example, in a 3D printed permeable mould body the average diameter, e.g. over the length thereof, of such passages is between 0.05 mm and 0.8 mm, e.g. between 0.05 mm and 0.3 mm. The distance between adjacent passages may for example be between 1 mm to 5 mm. It is also conceivable that the fine openings are created by perforation of a printed mould body or mould body component, e.g. using laser drilling, high pressure jet drilling, or the like.

For example, using a rapid prototyping technique fine passages are made in the permeable body that taper, so become narrower from an inlet side thereof to the fine opening in the surface of the mould cavity, e.g. over the entire length of the passage or over a portion thereof. This production is preferably done without requiring a further machining step to form these passages for the ejection fluid.

The rotary mould drum further comprises at least one ejection fluid inlet associated with a group of mould cavities from which moulded food products are to be ejected simultaneously. In embodiments, one ejection fluid inlet per lane of cavities is provided, preferably at a head end, also called axial end, of the drum. Optionally, ejection fluid inlets common to the same lane are provided at opposed head ends of the drum. In alternative embodiments, for example, one ejection fluid inlet per cavity is provided. It is also conceivable that one or more ejection fluid inlets are provided in the outer drum surface, e.g. in proximity to a head end of the drum.

One or more channels extend from each ejection fluid inlet to the one or more permeable volumes of the group of mould cavities. The one or more channels provide communication from the at least one ejection fluid inlet via the channels and via the permeable volumes into the mould cavities to assist in ejection of the moulded products from the group of mould cavities.

The ejection fluid inlet allows the entry of ejection fluid, e.g. of pressurized ejection fluid, e.g. compressed air, e.g. with a volumetric flow rate. This may also be referred to as volume flow rate, rate of fluid flow or volume velocity, and is defined as the volume of fluid which passes per unit time; usually represented by the symbol Q. The SI unit is $m^3/s$ (cubic metres per second).

Decrease in volumetric flow rate of the fluid is caused by a fluid flow resistance. The resistance to a fluid flow can be continuous or localized, e.g. caused by a change of medium through which the fluid flows, or e.g. by valves or throttles. Continuous resistance is e.g. caused by the viscosity of the same fluid, by the rugosity and the geometry of the channels, and the number of channels.

Fluid flow resistance may originate from friction between the fluid and walls of the volume through which the fluid flows. The less resistance, the larger the flow rate. In a permeable volume, fluid flow resistance originates from friction between the fluid and walls of the fine openings of the permeable volume. In a channel, the fluid flow resistance increases with the length of the channel.

The ejection fluid inlet allows the entry of ejection fluid. In the mould drum, the volumetric flow rate of the ejection fluid decreases over the number and length of the fluid channels, and through the permeable volume, until it reaches the mould cavities. The larger the volumetric flow rate at the mould cavities, the more fluid assists in the ejection and removal of a product.

In general, fluid flow resistance in the permeable volume attributes to the distribution of the fluid flow over the fine openings in the surface delimiting a mould cavity. In a permeable volume delimiting a mould cavity having a very small fluid flow resistance, there may be an increased risk that the fluid flow will be distributed over only part of the fine openings, and not to all. E.g. clogged fine openings may not be properly opened by the fluid flow when the fluid flow resistance is too small in general. A set volumetric flow rate at the ejection fluid inlet results in a decreased fluid flow at the cavity, to assist in the ejection of a product from a mould cavity.

Porosity is defined as a fraction of the volume of voids over the total volume. By increasing the volume of voids, i.e. a larger porosity, the fluid flow resistance is decreased and the volumetric flow rate increased.

Pore density is defined as the number of fine openings in a volume. The higher the density, the smaller the pore size. Volumes with equal porosity in % can be produced, having different pore sizes and thus different pore densities. The volume with most of the fine openings, i.e. the largest pore density, will have an increased fluid flow resistance and a lower volumetric flow rate. The volume with least of the fine openings, i.e. the lowest pore density, with fine openings having relatively larger diameters, will have a decreased fluid flow resistance and allow a relatively large volumetric flow rate.

The fluid channels, e.g. a part of the length thereof, can in embodiments be provided in the permeable volume. It is also possible that the fluid channels are formed in a support member that supports the one or more permeable bodies on a surface thereof. Such one or more fluid channels can, as is known in the art, be made as a groove or a set of parallel grooves in a surface of a support member, e.g. at the interface with the permeable body, e.g. adjacent to where a permeable mould body is positioned. For example, one or more mould bodies are generally mounted over a channel in a support member.

One or more fluid channels associated with a lane of cavities can extend from a single ejection fluid inlet. It is both conceivable that a single fluid channel is provided below a lane of cavities, or that a set of multiple parallel fluid channels extends below a lane of cavities.

In an embodiment the fluid channels extend parallel to the drum rotation axis.

A commonly used fluid to assist in the ejection removal of a product from a mould cavity is air, in particular compressed air. Other ejection fluids, or mixtures of fluids, are also conceivable, such as water, edible oil, $CO_2$.

It is also conceivable, and known in the art, that the channels for the ejection fluid are used for cleaning of the mould member by a cleaning fluid that is flushed through the channels. This is for example done with the mould member being removed from the installation, e.g. in a dedicated cleaning device for the mould member. Such a cleaning fluid may include water, chemical fluids, e.g. including bleach, disinfectants, bacteriostatic agents, etc.

In embodiments, as known in the art, the mould member is provided with fluid-tight barriers between one or more mould cavities and/or between lanes of mould cavities. This allows ejection fluid, such as compressed air, to be provided to a group of mould cavities from which food products are to be ejected simultaneously, without ejection fluid passing to mould cavities at the other side of the barrier. Such a fluid-tight barrier is e.g. provided by locally impregnating the porous body with a resin as is known in the art. Alternatively solid material barrier members can be integrated into porous bodies or porous bodies being held in solid barrier members.

In embodiments of a mould drum, the curved outer surface of the body of porous material is fluid tight. In embodiments, this outer surface is made fluid tight. It is also conceivable that the outer surface was made porous, followed by a sealing step to make the curved outer surface fluid tight. For example, a burnish treatment using one or more rollers is applied, creating a sealed layer, e.g. of approximately 1 mm. Other mechanical deformation techniques used to provide the fluid-tight barrier include mechanical polishing, grinding or media blasting. Yet alternatively, a fluid-tight barrier is provided at the outer surface with a different technique, such as impregnation with a resin or coating. With 3 D printing techniques it is also possible to make part of the body porous, and another part, such as the outer surface, solid and fluid-tight.

In an embodiment the configuration of the at least one ejection fluid inlet, associated channel(s), permeable volume(s), and group of mould cavities from which food products are to be ejected simultaneously is such that the flow resistance for a flow of pressurized ejection fluid is not uniform. This advantageously attributes to one or more of the following: a more efficient use of ejection fluid, e.g. a reduced air consumption, an improved removal of products from the cavities, and/or less damage of products during ejection.

A first aspect of the invention relates to a rotary cylindrical mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation, wherein the mould drum has in the drum surface multiple recessed mould cavities, each mould cavity defining a shape of the product, which is to be moulded, the mould cavities each having an opening in the drum surface for the introduction of foodstuff mass into the mould cavity and for the ejection of the moulded product, the mould drum having at least one permeable mould body comprising:

a curved outer surface forming at least part of the outer circumferential drum surface, which curved outer surface of the permeable mould body is fluid tight; one or more of the mould cavities, a permeable volume comprising fine openings opening out at the one or more mould cavities, such that each mould cavity of the permeable mould body is delimited at least in part by a permeable volume, the mould member further comprising, for each group of mould cavities from which food products are to be ejected simultaneously:

at least one ejection fluid inlet allowing the entry of pressurized fluid, one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the configuration of the at least one ejection fluid inlet, associated channel(s), permeable volume(s), and group of mould cavities from which food products are to be ejected simultaneously is such that a permeable volume delimiting a cavity 'nearest' to the at least one ejection fluid inlet has a first fluid flow resistance P1 for a flow of pressurized ejection fluid, which is larger than a second fluid flow resistance P2 of a permeable volume delimiting a cavity 'furthest' from the at least one ejection fluid inlet. The configuration at least partly compensates for the decrease in volumetric flow rate over the length of a fluid channel.

This approach allows to at least partly compensate for any undesired non-uniformity, e.g. decrease, in volumetric flow rate and/or in pressure of the ejection fluid, over the length of the fluid channel. This may allow for a more efficient use of ejection fluid, e.g. allow for a reduction in the demand for compressed air for the ejection of the moulded products, thereby saving expenses in production of the food products. It may also, or alternatively to reducing consumption of ejection fluid, allow for a more uniform ejection of food products from longitudinally spaced apart cavities in the same lane, with a lane comprising a group of cavities from which food products are to be ejected simultaneously. It will be appreciated that this design, as well as other designs described herein, may be of advantage when the channel is relatively long between the inlet and the most remote mould cavity connected to the channel, for example in an embodiment having a length of more than 50 centimetres. In embodiments the ejection fluid inlet is arranged in proximity of, or in, an end face of drum, as is known in the art. For example, the design, as well as other designs described herein, is advantageous for a drum having a length of more than 50 centimetres, e.g. between 60 and 120 centimetres, e.g. of about 100 centimetres, wherein the one or more ejection fluid inlets are arranged in proximity of, or in, an end face of drum.

In embodiments, the first, relatively large fluid flow resistance P1 of the permeable volume is caused by a relatively low porosity and/or a relatively high pore density of the permeable volume. Other measures to adjust the fluid flow resistance are also conceivable, such as providing the permeable volume with coating that locally decreases or increases the fluid flow resistance.

Yet alternatively, a relatively large fluid flow resistance could be created by a relatively large thickness of the permeable volume, between channel and mould cavity. With a decreasing thickness of the permeable volume between channel and mould cavity, a decreasing fluid flow resistance can be created and an increasing fluid flow rate. In embodiments, the thickness decreases over a group of mould cavities from which food products are to be ejected simultaneously.

In embodiments, the mould cavities are arranged in the outer drum surface in a mould cavities pattern with lanes of cavities, wherein in each lane cavities are located at multiple longitudinal positions when seen in longitudinal direction of the mould drum. When several lanes are present on the drum also circular arrays of cavities at multiple circumferential positions when seen in the direction of rotation of the mould drum can be provided for if desired. A lane may be straight or in the form of a helix.

Preferably, the configuration of channels and mould cavities is such that channels extend below lanes of cavities, and that in each lane of cavities at least one cavity is 'nearest' to the ejection fluid inlet and at least one cavity is 'furthest' from the ejection fluid inlet. For example, in embodiments with one ejection fluid inlet at a head end of the drum, there is one 'nearest' cavity at the same head end, and one 'furthest' cavity at the opposed head end of the drum. It is also conceivable that there is an ejection fluid inlet at a central part of the drum, resulting in two 'nearest' cavities at the central part, and two 'furthest' cavities at the head ends. In embodiments with ejection fluid inlets at both head ends of the drum, there are two 'nearest' cavities at the head ends, and one or two 'furthest' cavities in the central part.

It is conceivable that the permeable volume of each of the cavities at a longitudinal position when seen in longitudinal direction of the mould drum has distinct fluid flow resistances and advantageously distinct porosities/pore densities. It is also possible that a decreased fluid flow resistance in the permeable volumes is achieved by providing zones of different fluid flow resistances along longitudinal positions, e.g. two types of fluid flow resistances in the mould drum, with advantageously distinct porosities/pore densities.

The invention also relates to a rotary mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation,
  wherein the mould drum has in the outer circumferential drum surface multiple recessed mould cavities, each mould cavity defining a shape of the product, which is to be moulded, the mould cavities each having an opening in the outer circumferential drum surface for the introduction of foodstuff mass into the mould cavity and for the ejection of the moulded product, the mould drum having at least one permeable mould body comprising:
    a curved outer surface forming at least part of the outer circumferential drum surface, which curved outer surface of the permeable mould body is fluid tight;
    one or more of the mould cavities,
    a permeable volume comprising fine openings opening out at the one or more mould cavities,
  such that each mould cavity of the permeable mould body is delimited at least in part by a permeable volume,
  the mould drum further comprising, for each group of mould cavities from which food products are to be ejected simultaneously:
    at least two ejection fluid inlets provided at opposite axial ends of the drum, e.g. in an end face or in proximity of the end face, each ejection fluid inlet allowing the entry of pressurized fluid;
    one or more channels extending from each of said at least two ejection fluid inlets to the one or more permeable volumes of the group of mould cavities,
  the one or more channels providing communication from each of the ejection fluid inlets via the channels and via the permeable volumes into the mould cavities to assist in ejection of the moulded products from the group of mould cavities,
  wherein the configuration of the at least two ejection fluid inlets, associated channel(s), permeable volume(s), and group of mould cavities from which food products are to be ejected simultaneously, is such that one or more channels associated with at least one fluid inlet at one axial end of the drum is/are alternated by one or more channels associated with at least one fluid inlet at the opposed axial end of the drum.

In an embodiment a mould cavity nearest to one axial end of the drum is thus reached by a short channel extending from the nearby ejection fluid inlet to said cavity, as well as reached by a relatively long channel extending from the other, remote, ejection fluid inlet. For instance both inlets are simultaneously supplied with a pressurized ejection gas, e.g. air.

This approach allows to at least partly compensate for any undesired non-uniformity, e.g. decrease, in volumetric flow rate and/or in pressure of the ejection fluid, over the length of the fluid channel. This may allow for a more efficient use of ejection fluid, e.g. allow for a reduction in the demand for compressed air for the ejection of the moulded products, thereby saving expenses in production of the food products. It may also, or alternatively lead to reducing consumption of ejection fluid, allow for a more uniform ejection of food products from longitudinally spaced apart cavities in the same lane, with a lane comprising a group of cavities from which food products are to be ejected simultaneously. It will be appreciated that this design, as well as other designs described herein, may be of advantage when the channel is relatively long between the inlet and the most remote mould cavity connected to the channel, for example in an embodiment having a length of more than 50 centimetres. In embodiments the ejection fluid inlet is arranged in proximity of, or in, an end face of drum, as is known in the art. For example, the design, as well as other designs described herein, is advantageous for a drum having a length of more than 50 centimetres, e.g. between 60 and 120 centimetres, e.g. of about 100 centimetres, wherein the one or more ejection fluid inlets are arranged in proximity of, or in, an end face of drum.

Another aspect of the invention relates to a rotary mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation,
  wherein the mould drum has in the drum surface multiple recessed mould cavities, each mould cavity defining a shape of the product, which is to be moulded, the mould cavities each having an opening in the drum surface for the introduction of foodstuff mass into the mould cavity and for the ejection of the moulded product,
  the mould drum having at least one permeable mould body comprising:
    a curved outer surface forming at least part of the outer circumferential drum surface, which curved outer surface of the permeable mould body is fluid tight;
    one or more of the mould cavities,
    a permeable volume comprising fine openings opening out at the one or more mould cavities,
  such that each mould cavity of the permeable mould body is delimited at least in part by a permeable volume,
  the mould member further comprising, for each group of mould cavities from which moulded food products are to be ejected simultaneously:
    at least one ejection fluid inlet allowing the entry of pressurized fluid,
    one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the configuration of the at least one ejection fluid inlet, associated channel(s), permeable volume(s), and group of mould cavities from which moulded food products are to be ejected simultaneously is such that a first channel extending from the at least one ejection fluid inlet to a cavity 'nearest' to the ejection fluid inlet has a first fluid flow resistance C1 for a flow of ejection fluid, which is larger than a second fluid flow resistance C2 of a second channel extending from the at the at least one ejection fluid inlet to a cavity 'furthest' from the ejection fluid inlet.

This approach allows to at least partly compensate for any undesired non-uniformity, e.g. decrease, in volumetric flow rate and/or in pressure of the ejection fluid, over the length of the fluid channel. This may allow for a more efficient use of ejection fluid, e.g. allow for a reduction in the demand for compressed air for the ejection of the moulded products, thereby saving expenses in production of the food products. It may also, or alternatively to reducing consumption of ejection fluid, allow for a more uniform ejection of food products from longitudinally spaced apart cavities in the same lane, with a lane comprising a group of cavities from which food products are to be ejected simultaneously. It will be appreciated that this design, as well as other designs described herein, may be of advantage when the channel is relatively long between the inlet and the most remote mould cavity connected to the channel, for example in an embodiment having a length of more than 50 centimetres. In embodiments the ejection fluid inlet is arranged in proximity of, or in, an end face of drum, as is known in the art. For example, the design, as well as other designs described herein, is advantageous for a drum having a length of more than 50 centimetres, e.g. between 60 and 120 centimetres, e.g. of about 100 centimetres, wherein the one or more ejection fluid inlets are arranged in proximity of, or in, an end face of drum.

The invention also relates to a movable mould member configured for use in an installation for moulding food products from a pumpable foodstuff mass, the mould member having an outer surface, in operation the mould member being movably supported to move in a direction of movement, e.g. a mould drum revolving about a drum rotation axis in a direction of rotation or a mould turret disk having a circular array of mould cavities that revolves about an axis of rotation, wherein the mould member has in the outer surface multiple recessed mould cavities, each mould cavity defining a shape of the product, which is to be moulded, the mould cavities each having an opening in the outer mould member surface for the introduction of foodstuff mass into the mould cavity and for the ejection of the moulded product, the mould member having at least one permeable mould body comprising:

an outer surface forming at least part of the outer mould member surface, which outer surface of the permeable mould body is fluid tight;
one or more of the mould cavities,
a permeable volume comprising fine openings opening out at the one or more mould cavities, such that each mould cavity of the permeable mould body is delimited at least in part by a permeable volume, the mould member further comprising, for each group of mould cavities from which food products are to be ejected simultaneously:

at least one first ejection fluid inlet allowing the entry of ejection fluid, and
at least one second ejection fluid inlet allowing the entry of ejection fluid, and
one or more channels associated with the at least one first ejection fluid inlet extending from the at least one first ejection fluid inlet to the one or more permeable volumes of the group of mould cavities,
one or more channels associated with the at least one second ejection fluid inlet extending from the at least one second ejection fluid inlet to the one or more permeable volumes of the group of mould cavities,
the one or more channels providing communication from the associated ejection fluid inlet(s) via the channels and via the permeable volumes into the mould cavities to assist in ejection of the moulded products from the group of mould cavities,
wherein each of the at least one first and at least one second ejection fluid inlet allows the entry of fluid, and wherein the configuration of the at least one first and at least one second ejection fluid inlet, associated channel(s), permeable volume(s), and group of mould cavities from which food products are to be ejected simultaneously is such that one or more channels extending from the associated at least one first ejection fluid inlet to a mould cavity allow a first flow of ejection fluid, which is separate from a second fluid flow of ejection fluid in one or more channels extending from the associated at least one second ejection fluid inlet to the same one mould cavity.

For example, one or more channels extending from the associated at least one first ejection fluid inlet extend to a trailing zone (TZ) of the one mould cavity, and one or more channels extending from the associated at least one second ejection fluid inlet into a leading zone (LZ) of the same one mould cavity, seen in the direction of movement (M).

In another example, one or more channels extending from the associated at least one first ejection fluid inlet extend to a shallow zone of a mould cavity, and one or more channels extending from the associated at least one second ejection fluid inlet extend to a deep zone of the same mould cavity.

In another example, one or more channels extending from the associated at least one first ejection fluid inlet extend to a peripheral zone of a mould cavity, and one or more channels extending from the associated at least one second ejection fluid inlet extend to a bottom zone of the same mould cavity.

Each of the at least one first and at least one second ejection fluid inlet allows the entry of ejection fluid. In embodiments, the at least one first and at least one second ejection fluid inlet allow the entry of distinct ejection fluids. For example, a water flow and an air flow.

It is also conceivable that the at least one first and at least one second ejection fluid inlet allow the entry of the same ejection fluid at a different pressure and/or a different temperature.

Another aspect of the invention relates to a moveable mould member configured for use in an installation for moulding food products from a pumpable foodstuff mass, the mould member having an outer surface, in operation the mould member being movably supported to move in a direction of movement, e.g. a mould drum revolving about a drum rotation axis in a direction of rotation, wherein the mould member has in the surface multiple recessed mould cavities, each mould cavity defining a shape of the product, which is to be moulded, the mould cavities each having an opening in the outer surface for the introduction of foodstuff mass into the mould cavity and for the ejection of the moulded product, the mould member having at least one permeable mould body comprising:
  an outer surface forming at least part of the outer surface of the mould member, which outer surface of the permeable mould body is fluid tight;
  one or more of the mould cavities,
  a permeable volume comprising fine openings opening out at the one or more mould cavities, such that each mould cavity of the permeable mould body is delimited at least in part by a permeable volume, the mould member further comprising, for each group of mould cavities from which food products are to be ejected simultaneously:
  at least one ejection fluid inlet allowing the entry of pressurized fluid,
  one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the permeable volume delimiting a mould cavity has a first fluid flow resistance P1 for a flow of ejection fluid into a trailing zone of the cavity, which is different from, e.g. larger than, a second fluid flow resistance P2 for a flow of ejection fluid into a leading zone of the cavity, seen in the direction of movement. This may be done so as to create a relatively low volumetric flow rate at the trailing zone, e.g. to have more efficient use of fluid.

In embodiments, the mould member is configured as a plate. The direction of movement can be reciprocating, such as known from Formax. It is also conceivable that the plate is a disc which revolves in a rotation direction about its central axis, perpendicular to the plane of the disc, similar to a turret machine.

The invention also relates to a rotary mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation, wherein the mould drum has in the drum surface multiple recessed mould cavities, each mould cavity defining a shape of the product, which is to be moulded, the mould cavities each having an opening in the drum surface for the introduction of foodstuff mass into the mould cavity and for the ejection of the moulded product, the mould drum having at least one permeable mould body comprising:
  a curved outer surface forming at least part of the outer circumferential drum surface, which curved outer surface of the permeable mould body is fluid tight;
  one or more of the mould cavities,
  a permeable volume comprising fine openings opening out at the one or more mould cavities, such that each mould cavity of the permeable mould body is delimited at least in part by a permeable volume, the mould member further comprising, for each group of mould cavities from which moulded food products are to be ejected simultaneously:
  at least one ejection fluid inlet allowing the entry of pressurized fluid,
  one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the permeable volume delimiting a mould cavity has a first fluid flow resistance P1 for a flow of ejection fluid into a trailing zone of the cavity, which is different from, e.g. larger than, a second fluid flow resistance P2 for a flow of ejection fluid into a leading zone of the same mould cavity, seen in the direction of rotation of the mould drum.

The trailing zone is advantageously the rearest zone of a mould cavity, seen in the direction of movement (M). I.e. the zone adjoining a rear end of the mould cavity, possibly a rear wall of the mould cavity. It is conceivable that between the leading and the trailing zone one or more central zones are present in the mould cavity.

In embodiments this design creates a relatively low volumetric flow rate at the trailing zone compared to the leading zone, e.g. when both zones are in communication with a common channel or common channels supplied with ejection fluid, e.g. via one or two ejection fluid inlets of the channel or channels.

This design may enhance ejection of the food product from the mould cavity, e.g. of advantage for relatively large food products like hamburgers, meat patties, chicken fillet type products, e.g. food products having a diameter of more than 6 centimetres.

For example, the design allows to reduce consumption of ejection fluid, e.g. compressed air, through having the ejection fluid passing through the leading zone causing the food product to become ejected, at least in part, first from the mould cavity, with gravity then assisting the release of the food product from the trailing zone of the mould cavity, thus potentially requiring less ejection fluid, e.g. compressed air, for the ejection from said trailing zone.

In embodiments, the first, relatively large fluid flow resistance P1 of the permeable volume is caused by a relatively low porosity and/or a relatively high pore density of the permeable volume.

In embodiments, the permeable volume comprises distinct materials to create distinct fluid flow resistances in the leading and the trailing zones. For example, a porous material component, e.g. sintered porous metal body, forms a component that delimits one zone, e.g. the leading zone, and another component, e.g. a 3D printed component, from the other zone, e.g. the trailing zone.

Yet alternatively, a relatively large fluid flow resistance could be created by a relatively large thickness of the permeable volume, between the one or more channels and the mould cavity. With a decreasing thickness of the permeable volume between channel and mould cavity, a decreasing fluid flow resistance can be created and an increasing fluid flow rate. In embodiments, the thickness decreases over a mould cavity from the trailing to the leading zone.

Another aspect of the invention relates to a moveable mould member configured for use in an installation for moulding food products from a pumpable foodstuff mass, the mould member having an outer surface, in operation the mould member being movably supported to move in a direction of movement, wherein the mould member has in the surface multiple recessed mould cavities, each mould cavity defining a shape of the product, which is to be moulded, the mould cavities each having an opening in the outer mould member surface for the introduction of foodstuff mass into the mould cavity and for the ejection of the moulded product, the mould member having at least one permeable mould body comprising:
an outer surface forming at least part of the outer mould member surface, which outer surface of the permeable mould body is fluid tight;
one or more of the mould cavities,
a permeable volume comprising fine openings opening out at the one or more mould cavities,
such that each mould cavity of the permeable mould body is delimited at least in part by a permeable volume,
the mould member further comprising, for each group of mould cavities from which moulded food products are to be ejected simultaneously:
at least one ejection fluid inlet allowing the entry of pressurized fluid,
one or more channels extending from the at least one associated ejection fluid inlet to the one or more permeable volumes of the group of mould cavities,
the one or more channels providing communication from the at least one associated ejection fluid inlet via the channels and via the permeable volumes into the mould cavities to assist in ejection of the moulded products from the group of mould cavities, wherein
the configuration of the at least one ejection fluid inlet, associated channel(s), permeable volume(s), and group of mould cavities from which food products are to be ejected simultaneously is such that multiple channels are associated with one mould cavity, and wherein a first channel extending from the at least one ejection fluid inlet to a trailing zone of the one mould cavity has a first fluid flow resistance C1 for a flow of ejection fluid, which is different, preferably larger, than a second fluid flow resistance C2 for a flow of ejection fluid in a second channel extending from the at least one inlet to a leading zone of the same one mould cavity, seen in the direction of movement. In embodiments this design allows to create a relatively low volumetric flow rate at the trailing zone to have more efficient use of ejection fluid.

In embodiments, the mould member is configured as a plate. The direction of movement can be reciprocating, such as known from Formax plate forming machines. It is also conceivable that the plate is a disk provided with a circular array of mould cavities, which disk revolves in a rotation direction about its central axis, similar to a turret machine.

The invention also relates to a rotary mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation, wherein the mould drum has in the drum surface multiple recessed mould cavities, each mould cavity defining a shape of the product, which is to be moulded, the mould cavities each having an opening in the drum surface for the introduction of foodstuff mass into the mould cavity and for the ejection of the moulded product, the mould drum having at least one permeable mould body comprising:
a curved outer surface forming at least part of the outer circumferential drum surface, which curved outer surface of the permeable mould body is fluid tight;
one or more of the mould cavities,
a permeable volume comprising fine openings opening out at the one or more mould cavities,
such that each mould cavity of the permeable mould body is delimited at least in part by a permeable volume,
the mould member further comprising, for each group of mould cavities from which moulded food products are to be ejected simultaneously:
at least one ejection fluid inlet allowing the entry of pressurized fluid,
one or more channels extending from the at least one associated ejection fluid inlet to the one or more permeable volumes of the group of mould cavities,
the one or more channels providing communication from the at least one associated ejection fluid inlet via the channels and via the permeable volumes into the mould cavities to assist in ejection of the moulded products from the group of mould cavities,
wherein
the configuration of the at least one ejection fluid inlet, associated channel(s), permeable volume(s) and group of mould cavities from which food products are to be ejected simultaneously is such that multiple channels are associated with one mould cavity, and
wherein a first channel extending from the at least one ejection fluid inlet to a trailing zone of the one mould cavity has a first fluid flow resistance C1 for a flow of ejection fluid, which is different from, e.g. larger than, a second fluid flow resistance C2 for a flow of ejection fluid in a second channel extending from the at least one inlet to a leading zone of the same one mould cavity, seen in the direction of rotation. In embodiments this design allows to create a relatively low volumetric flow rate at the trailing zone, e.g. in order to have more efficient use of ejection fluid.

Another aspect of the invention relates to a movable mould member configured for use in an installation for moulding food products from a pumpable foodstuff mass, the mould member having an outer surface, in operation the mould member being movably supported to move in a direction of movement, wherein the mould member has in the outer mould member surface multiple recessed mould cavities, each mould cavity defining a shape of the product, which is to be moulded, the mould cavities each having an opening in the outer mould member surface for the introduction of foodstuff mass into the mould cavity and for the ejection of the moulded product, the mould member having at least one permeable mould body comprising:
an outer surface forming at least part of the outer mould member surface, which outer surface of the permeable mould body is fluid tight;
one or more of the mould cavities,
a permeable volume comprising fine openings opening out at the one or more mould cavities,
such that each mould cavity of the permeable mould body is delimited at least in part by a permeable volume, the mould member further comprising, for each group of mould cavities from which food products are to be ejected simultaneously:
  at least one ejection fluid inlet allowing the entry of pressurized fluid,
  one or more channels extending from the at least one associated ejection fluid inlet to the one or more permeable volumes of the group of mould cavities,
the one or more channels providing communication from the at least one associated ejection fluid inlet via the channels and via the permeable volumes into the mould cavities to assist in ejection of the moulded products from the group of mould cavities,
wherein the mould member comprises mould cavities each having a relatively deep zone and a relatively shallow zone relative to an imaginary curved plane of the fill opening,
wherein the permeable volume delimiting a mould cavity has a first fluid flow resistance P1 for a flow of pressurized ejection fluid into the shallow zone of the cavity, which is different from, e.g. larger than, a second fluid flow resistance P2 for a flow of pressurized ejection fluid into the deep zone of the cavity. In embodiments this design creates a relatively low volumetric flow rate at the shallow zone(s), e.g. in order to avoid damage to the food products upon ejection, e.g. thin portions of the product becoming damaged due to impact thereon of ejection fluid, e.g. compressed air.

In embodiments, the mould member is configured as a plate. The direction of movement can be reciprocating, such as known from Formax. It is also conceivable that the plate is a disc with a circular array of mould cavities, which disc moves in a rotation direction about its central axis, similar to a turret.

The invention also relates to a rotary mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation,
  wherein the mould drum has in the drum surface multiple recessed mould cavities, each mould cavity defining a shape of the product, which is to be moulded, the mould cavities each having an opening in the drum surface for the introduction of foodstuff mass into the mould cavity and for the ejection of the moulded product,
  the mould drum having at least one permeable mould body comprising:
    a curved outer surface forming at least part of the outer circumferential drum surface, which curved outer surface of the permeable mould body is fluid tight;
    one or more of the mould cavities,
    a permeable volume comprising fine openings opening out at the one or more mould cavities,
  such that each mould cavity of the permeable mould body is delimited at least in part by a permeable volume,
  the mould member further comprising, for each group of mould cavities from which food products are to be ejected simultaneously:
    at least one ejection fluid inlet allowing the entry of pressurized fluid,
    one or more channels extending from the at least one associated ejection fluid inlet to the one or more permeable volumes of the group of mould cavities,
  the one or more channels providing communication from the at least one associated ejection fluid inlet via the channels and via the permeable volumes into the mould cavities to assist in ejection of the moulded products from the group of mould cavities, comprising mould cavities each having a relatively deep zone and a relatively shallow zone relative to an imaginary curved plane of the fill opening,
  wherein the permeable volume delimiting a mould cavity has a first fluid flow resistance P1 for a flow of pressurized ejection fluid into the shallow zone of the cavity, which is different from, e.g. larger than, a second fluid flow resistance P2 for a flow of pressurized ejection fluid into the deep zone of the cavity. In embodiments this design creates a relatively low volumetric flow rate at the shallow zone(s), e.g. in order to avoid damage to the products upon ejection from the mould cavity, e.g. avoiding that ejection fluid damages thin portion(s) of the food product. This is in particular advantageous for products having a thinner part at (parts of) the circumference, such as products having a shape of chicken breast fillets, tenderloins etc.

The first, relatively large, fluid flow resistance P1 of the permeable volume could e.g. be caused by:
  a relatively low porosity; and/or
  a relatively high pore density of the permeable volume, and/or
  a relatively large thickness of the permeable volume, between the one or more channels and the mould cavity.

With a decreasing thickness of the permeable volume between the one or more channel and the mould cavity, a decreasing fluid flow resistance can be created and an increasing fluid flow rate. In embodiments, the thickness of the permeable volume is large below the shallow zone of the cavity, and large below the deep zone(s) of the mould cavity.

Another aspect of the invention relates to a moveable mould member configured for use in an installation for moulding food products from a pumpable foodstuff mass, the mould member having an outer surface, in operation the mould member being movably supported to move in a direction of movement,
  wherein the mould member has in the outer surface multiple recessed mould cavities, each mould cavity defining a shape of the product, which is to be moulded, the mould cavities each having an opening in the outer mould member surface for the introduction of foodstuff mass into the mould cavity and for the ejection of the moulded product,
  the mould member having at least one permeable mould body comprising:
    an outer surface forming at least part of the outer mould member surface, which outer surface of the permeable mould body is fluid tight;
    one or more of the mould cavities,
    a permeable volume comprising fine openings opening out at the one or more mould cavities,
  such that each mould cavity of the permeable mould body is delimited at least in part by a permeable volume,
  wherein the mould member further comprises, for each group of mould cavities from which moulded food products are to be ejected simultaneously:
    at least one ejection fluid inlet allowing the entry of pressurized fluid,
    one or more channels extending from the at least one associated ejection fluid inlet to the one or more permeable volumes of the group of mould cavities,
  the one or more channels providing communication from the at least one associated ejection fluid inlet via the channels and via the permeable volumes into the mould cavities to assist in ejection of the moulded products from the group of mould cavities, wherein wherein the configuration of the at least one ejection fluid inlet, associated channel(s), permeable volume(s), and group of mould cavities from which food products are to be ejected simultaneously is such that multiple channels are associated with one mould cavity, and wherein mould cavities each have a relatively deep zone and a relatively shallow zone relative to an imaginary curved plane of the fill opening, and wherein a first channel extending to a shallow zone of the one mould cavity has a first fluid flow resistance C1 for a flow of ejection fluid, which is different from, e.g. larger than, a second fluid flow resistance C2 for a flow of ejection fluid in a second channel extending from the at least one inlet to a deep zone of the same one mould cavity. In embodiments this design creates a relatively low volumetric flow rate at the shallow zone(s), e.g. in order to avoid damage to the products.

In embodiments, the mould member is configured as a plate. The direction of movement can be reciprocating, such as known from Formax. It is also conceivable that the plate moves in a rotation direction about its central axis, similar to a turret.

The invention also relates to a rotary mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation, wherein the mould drum has in the drum surface multiple recessed mould cavities, each mould cavity defining a shape of the product, which is to be moulded, the mould cavities each having an opening in the drum surface for the introduction of foodstuff mass into the mould cavity and for the ejection of the moulded product, the mould drum having at least one permeable mould body comprising:
  a curved outer surface forming at least part of the outer circumferential drum surface, which curved outer surface of the permeable mould body is fluid tight;
  one or more of the mould cavities,
  a permeable volume comprising fine openings opening out at the one or more mould cavities, such that each mould cavity of the permeable mould body is delimited at least in part by a permeable volume, wherein the mould member further comprises, for each group of mould cavities from which food products are to be ejected simultaneously:
  at least one ejection fluid inlet allowing the entry of pressurized fluid,
  one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the configuration of the at least one ejection fluid inlet, associated channel(s), permeable volume(s), and group of mould cavities from which food products are to be ejected simultaneously is such that multiple channels are associated with one mould cavity, and wherein mould cavities each have a relatively deep zone and a relatively shallow zone relative to an imaginary curved plane of the fill opening, and wherein a first channel extending to a shallow zone of the one mould cavity has a first fluid flow resistance C1 for a flow of ejection fluid, which is different from, e.g. larger than, a second fluid flow resistance C2 for a flow of ejection fluid in a second channel extending from the at least one inlet to a deep zone of the same one mould cavity. In embodiments this design creates a relatively low volumetric flow rate at the shallow zone(s), e.g. in order to avoid damage to the products upon ejection.

Another aspect of the invention relates to a moveable mould member configured for use in an installation for moulding food products from a pumpable foodstuff mass, the mould member having an outer surface, in operation the mould member being movably supported to move in a direction of movement, wherein the mould member has in the outer surface multiple recessed mould cavities, each mould cavity defining a shape of the product, which is to be moulded, the mould cavities each having an opening in the outer mould member surface for the introduction of foodstuff mass into the mould cavity and for the ejection of the moulded product, the mould member having at least one permeable mould body comprising:
  an outer surface forming at least part of the outer mould member surface, which outer surface of the permeable mould body is fluid tight;
  one or more of the mould cavities,
  a permeable volume comprising fine openings opening out at the one or more mould cavities, such that each mould cavity of the permeable mould body is delimited at least in part by a permeable volume, the mould member further comprising, for each group of mould cavities from which food products are to be ejected simultaneously:
  at least one ejection fluid inlet allowing the entry of pressurized fluid,
  one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the configuration of the at least one ejection fluid inlet, associated channel(s), permeable volume(s), and group of mould cavities from which food products are to be ejected simultaneously is such that the permeable volume has first zones having a relatively short fluid path length between a fluid channel and a mould cavity, and other zones having a relatively long fluid path length between a fluid channel and the same mould cavity, whereby to at least partly compensate for the difference in path length, the first zones of the permeable volume have a first fluid flow resistance P1, which is larger than a second fluid flow resistance P2 in the other zones of the permeable volume to attribute to a more uniform fluid flow rate into the same cavity.

In embodiments, the mould member is configured as a plate. The direction of movement can be reciprocating, such as known from Formax. It is also conceivable that the plate moves in a rotational direction about its central axis, similar to a turret.

The invention also relates to a rotary mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation, wherein the mould drum has in the drum surface multiple recessed mould cavities, each mould cavity defining a shape of the product, which is to be moulded, the mould cavities each having an opening in the drum surface for the introduction of foodstuff mass into the mould cavity and for the ejection of the moulded product, the mould drum having at least one permeable mould body comprising:

a curved outer surface forming at least part of the outer circumferential drum surface, which curved outer surface of the permeable mould body is fluid tight;

one or more of the mould cavities, a permeable volume comprising fine openings opening out at the one or more mould cavities, such that each mould cavity of the permeable mould body is delimited at least in part by a permeable volume, the mould member further comprising, for each group of mould cavities from which food products are to be ejected simultaneously:

at least one ejection fluid inlet allowing the entry of pressurized fluid, one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the configuration of the at least one ejection fluid inlet, associated channel(s), permeable volume(s) and group of mould cavities from which food products are to be ejected simultaneously is such that the permeable volume has first zones having a relatively short fluid path length between a fluid channel and a mould cavity, and other zones having a relatively long fluid path length between a fluid channel and the same mould cavity, whereby to at least partly compensate for the difference in path length, the first zones of the permeable volume have a first fluid flow resistance P1, which is different from, e.g. larger than, a second fluid flow resistance P2 in the other zones of the permeable volume to attribute to a more uniform fluid flow rate into the same cavity.

Another aspect of the invention relates to a movable mould member configured for use in an installation for moulding food products from a pumpable foodstuff mass, the mould member having an outer surface, in operation the mould member being movably supported to move in a direction of movement, wherein the mould member has in the outer surface multiple recessed mould cavities, each mould cavity defining a shape of the product, which is to be moulded, the mould cavities each having an opening in the outer mould member surface for the introduction of foodstuff mass into the mould cavity and for the ejection of the moulded product, the mould member having at least one permeable mould body comprising:

an outer surface forming at least part of the outer mould member surface, which outer surface of the permeable mould body is fluid tight;

one or more of the mould cavities, a permeable volume comprising fine openings opening out at the one or more mould cavities, such that each mould cavity of the permeable mould body is delimited at least in part by a permeable volume, the mould member further comprising, for each group of mould cavities from which moulded food products are to be ejected simultaneously:

at least one ejection fluid inlet allowing the entry of pressurized fluid, one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the configuration of the at least one ejection fluid inlet, associated channel(s), permeable volume(s), and group of mould cavities from which food products are to be ejected simultaneously is such that multiple channels are associated with one mould cavity, and the permeable volume has first zones having a relatively short fluid path length between a fluid channel and a mould cavity, and other zones having a relatively long fluid path length between a fluid channel and the same mould cavity, whereby to at least partly compensate for the difference in path length, a first channel extending to a first zone of the cavity has a first fluid flow resistance $C1$ for a flow of ejection fluid, which is larger than a second fluid flow resistance $C2$ in a second channel extending to the other zone of the cavity. For example, this allows to enhance uniformity of the fluid flow rate into the same mould cavity.

In embodiments, the mould member is configured as a planar plate. The direction of movement can be reciprocating, such as known from Formax plate formers. It is also conceivable that the plate is a disc that moves in a rotation direction about its central axis, similar to a turret.

The invention also relates to a rotary mould drum configured for use in an installation for moulding food products from a pumpable foodstuff mass, the mould drum having an outer circumferential drum surface and a longitudinal drum rotation axis, in operation the drum being rotatably supported to revolve about the drum rotation axis in a direction of rotation, wherein the mould drum has in the drum surface multiple recessed mould cavities, each mould cavity defining a shape of the product, which is to be moulded, the mould cavities each having an opening in the drum surface for the introduction of foodstuff mass into the mould cavity and for the ejection of the moulded product, the mould drum having at least one permeable mould body comprising:

a curved outer surface forming at least part of the outer circumferential drum surface, which curved outer surface of the permeable mould body is fluid tight;

one or more of the mould cavities, a permeable volume comprising fine openings opening out at the one or more mould cavities, such that each mould cavity of the permeable mould body is delimited at least in part by a permeable volume, the mould member further comprising, for each group of mould cavities from which food products are to be ejected simultaneously:
- at least one ejection fluid inlet allowing the entry of pressurized fluid,
- one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the configuration of the at least one ejection fluid inlet, associated channel(s), permeable volume(s) and group of mould cavities from which food products are to be ejected simultaneously is such that multiple channels are associated with one mould cavity, and the permeable volume has first zones having a relatively short fluid path length between a fluid channel and a mould cavity, and other zones having a relatively long fluid path length between a fluid channel and the same mould cavity, whereby to at least partly compensate for the difference in path length, a first channel extending to a first zone of the cavity has a first fluid flow resistance $C1$ for a flow of ejection fluid, which is different from, e.g. larger than, a second fluid flow resistance $C2$ in a second channel extending to the other zone of the cavity. In embodiments this design allows to enhance uniformity of the fluid flow rate into the same mould cavity.

Another aspect of the invention relates to a mould member configured for use in an installation for moulding food products from a pumpable foodstuff mass, the mould member having an outer surface, wherein the mould member has in the surface multiple recessed mould cavities, each mould cavity defining a shape of the product which is to be moulded, the mould cavities each having an opening in the outer mould member surface for the introduction of foodstuff mass into the mould cavity and for the ejection of the moulded product, the mould member having at least one permeable mould body comprising:
- an outer surface forming at least part of the outer mould member surface, which outer surface of the permeable mould body is fluid tight;
- one or more of the mould cavities,
- a permeable volume comprising fine openings opening out at the one or more mould cavities, such that each mould cavity of the permeable mould body is delimited at least in part by a permeable volume, the mould member further comprising, for each group of mould cavities from which moulded food products are to be ejected simultaneously:
- at least one ejection fluid inlet allowing the entry of pressurized fluid,
- one or more channels extending from the at least one associated ejection fluid inlet to the one or more permeable volumes of the group of mould cavities, the channels providing communication from the at least one associated ejection fluid inlet via the channels and via the permeable volumes into the mould cavities to assist in ejection of the moulded products from the group of mould cavities, wherein distinct fluid flow resistance $P1$, $P2$ for a flow of pressurized ejection fluid entered via the ejection fluid inlet are provided in the one or more permeable volumes, for example a relatively large first fluid flow resistance $P1$ and a relatively small second fluid flow resistance $P2$, and wherein the configuration of channels, mould cavities, and the one or more permeable volumes with distinct flow resistances is such that the decrease in fluid flow resistance from $P1$ to $P2$ at least partly compensates for a decrease in volumetric flow rate of the pressurized fluid, to have more efficient use of ejection fluid.

The first, relatively large, fluid flow resistance $P1$ of the permeable volume is e.g. caused by:
- a relatively low porosity; and/or
- a relatively high pore density of the permeable volume, and/or
- a relatively large thickness of the permeable volume, between channel and mould cavity.

The present invention also relates to a movable mould member configured for use in an installation for moulding food products from a pumpable foodstuff mass, the mould member having an outer surface, wherein the mould member has in the outer mould member surface multiple recessed mould cavities, each mould cavity defining a shape of the product which is to be moulded, the mould cavities each having an opening in the outer mould member surface for the introduction of foodstuff mass into the mould cavity and for the ejection of the moulded product, the mould member having at least one permeable mould body comprising:
- an outer surface forming at least part of the outer mould member surface, which outer surface of the permeable mould body is fluid tight;
- one or more of the mould cavities,
- a permeable volume comprising fine openings opening out at the one or more mould cavities, such that each mould cavity of the permeable mould body is delimited at least in part by a permeable volume, the mould member further comprising, for each group of mould cavities from which moulded food products are to be ejected simultaneously:
- at least one ejection fluid inlet allowing the entry of pressurized fluid,
- one or more channels extending from the at least one associated ejection fluid inlet to the one or more permeable volumes of the group of mould cavities, the one or more channels providing communication from the at least one associated ejection fluid inlet via the channels and via the permeable volumes into the mould cavities to assist in ejection of the moulded products from the group of mould cavities, wherein the mould member comprises mould cavities each having alternating deep zones and relatively shallow zones relative to an imaginary plane of the opening of the mould cavity, e.g. a curved imaginary plane of the opening of the mould cavity in a mould drum, wherein the permeable volume delimiting a mould cavity has a constant thickness between mould cavity and channel. In embodiments this design allows for compensating for the deep and shallow zones, e.g. thereby providing an essentially constant fluid flow resistance $P1$ for a flow of pressurized ejection fluid into all zones of the cavity, e.g. so as to create a relatively constant volumetric flow rate at all the zones.

The permeable volume has an upper or outlet surface forming the bottom of the cavity where the fine openings are present, and a lower or inlet surface exposed to the fluid in the channel(s). In this embodiment, the upper surface and the lower surface of the permeable volume are of similar shape, as irregularities in the upper surface are matched by similar shaped irregularities in the lower surface. For example, food products with a ribbed bottom side may be formed in mould cavities with a ribbed bottom. According to the present embodiment, also the lower surface of the permeable volume then has a ribbed relief to achieve a substantially uniform thickness of the permeable volume between the upper and lower surfaces thereof. For example, herein, the permeable volume has a homogenous porosity throughout. The design may seek compensation for the difference in fluid path length and to create a relatively constant flow rate over all zones of the mould cavity.

The present invention also relates to a method for moulding of food products from a pumpable foodstuff mass, wherein use is made of an installation for moulding food products from a pumpable foodstuff mass comprising a moveable mould member having an outer surface, in operation the mould member being moved in a direction of movement, e.g. a rotary mould drum having an outer circumferential drum surface and a longitudinal drum rotation axis, in operation the drum revolving about the drum rotation axis in a direction of rotation,
- wherein the mould member has in the outer surface multiple recessed mould cavities, each mould cavity defining a shape of the product, which is to be moulded, the mould cavities each having an opening in the outer mould member surface for the introduction of foodstuff mass into the mould cavity and for the ejection of the moulded product,
- the mould member having at least one permeable mould body comprising:
  - an outer surface forming at least part of the outer mould member surface, which outer surface of the permeable mould body is fluid tight;
  - one or more of the mould cavities,
  - a permeable volume comprising fine openings opening out at the one or more mould cavities,
- such that each mould cavity of the permeable mould body is delimited at least in part by a permeable volume,
- the mould member further comprising, for each group of mould cavities from which food products are to be ejected simultaneously:
  - at least one ejection fluid inlet allowing the entry of pressurized fluid,
  - one or more channels extending from the at least one associated ejection fluid inlet to the one or more permeable volumes of the group of mould cavities,
- the one or more channels providing communication from the at least one associated ejection fluid inlet via the channels and via the permeable volumes into the mould cavities to assist in ejection of the moulded products from the group of mould cavities,
- wherein, preferably between a position of the mould member in which foodstuff mass is introduced into the mould cavity and another position of the mould member where ejection of the moulded product takes place, a first fluid, e.g. a pre-treatment fluid, is entered into the one or more channels, possibly also into the permeable volumes, possibly also via the fine openings into the mould cavities, e.g. said first fluid being introduced via the at least one ejection fluid inlet, e.g. said first fluid being water or a watery substance,
- and wherein at the position of ejection of the moulded product, an ejection fluid, e.g. compressed air, is entered into the at least one ejection fluid inlet, said ejection fluid assisting the ejection of the moulded products from the group of mould cavities.

In embodiments, the first fluid, or pre-treatment fluid, is a liquid, e.g. is water. Once liquid, e.g. water, has been introduced into the channel(s) as first fluid a gas, e.g. compressed air, could be employed as ejection fluid. The water may be beneficial in the ejection effect and/or in keeping the fine passages or fines openings clean and unclogged over time. The water may be supplied in an amount and manner such that the permeable volume(s) is/are wetted or soaked by the water ahead of the introduction of gaseous ejection fluid in the one or more channels. The water could contain a treatment agent for the moulded food product, e.g. a bacteriostatic agent. The water could contain some edible oil or the like of which some residue remains on the moulded product.

The introduction of water, e.g. wetting or soaking the permeable volume, may be done after the cavity is filled and ahead of the ejection step. In an alternative approach the first fluid, e.g. water, is already applied ahead or during the filling of the mould cavity with the mass of foodstuff. This may serve to avoid undue ingress of foodstuff mass into the fine openings and passages of the permeable volume.

Alternatively, the first fluid could be a pressurized gas, e.g. compressed air, at a pressure that is below the pressure of the ejection fluid which is applied at a later stage. The introduction of first fluid may seek to achieve an elevated pressure within the channel(s) and the permeable volume ahead of the introduction of higher-pressure gas at the moment of ejection. So effectively a pre-pressurization of the gas in the channel(s) and permeable volume ahead of the actual ejection. This may enhance the ejection process, e.g. allowing for more effective, e.g. faster, release of the product from the cavity, and/or reduction of the amount of ejection pressure fluid. It is advantageous to provide the first or pre-treatment fluid at a non-releasing initial pressure, so that the product then still remains reliably in the cavity ahead of the actual ejection step.

In an embodiment the first or pre-treatment fluid is also introduced via the one or more ejection fluid inlets into the one or more channels. In alternative embodiments one or more inlets dedicated to the introduction of the first or pre-treatment fluid can be provided in the mould member, said dedicated inlets being in communication with the channel(s).

Another aspect of the invention relates to a moulding installation for moulding food products from a pumpable foodstuff mass, which installation comprises:
- a frame,
- a mould member as described above, being movably supported by the frame,
- a mould member drive which, in operation, is coupled to the mould member to drive the mould member in a direction of movement,
- a mass feed member which, in operation, is arranged at a fill position relative to the mould member surface, said mass feed member being adapted to transfer mass into passing mould cavities of the
- movable mould member, said mass forming a food product in said mould cavity, an ejection fluid source arranged at a location to communicate with a passing ejection fluid inlet and configured to enter ejection fluid into said inlet.

In an embodiment, the mould member is a rotary mould drum being rotatably supported by the frame, e.g. the drum rotation axis being horizontal, and wherein the mould drum drive is in operation coupled to the drum to drive the drum in a rotational direction.

In an embodiment the installation comprises a discharge system adapted to receive and discharge conveyor, e.g. a discharge belt, extending underneath a horizontally mounted mould drum. For example, ejected products drop onto a discharge belt to be conveyed onwards. For example, the products are then fed to one or more of a coating device, an oven, a freezer, and/or a packaging installation.

The mass feed member can be of a simple configuration, e.g. as disclosed in WO00/30458. It is also conceivable that a more sophisticated mass feed member such as disclosed in WO2004/002229 of the same applicant is applied.

In embodiments, a pump for the foodstuff mass that is connected to the inlet of the mass feed member operates on the basis of a pressure control, e.g. a sensor detecting the pressure in the mass feed member and/or in the mould cavity that is being filled. It is also conceivable that the pump for the foodstuff mass operates based on the relative position of mould cavity and mouth, e.g. as described in WO2012161577.

In embodiments, the mould drum drive operates at a continuous speed, rotating the mould drum at a constant speed. It is also conceivable that the mould drum drive operates intermittently, allowing a mould cavity to stop, or nearly stop, opposite the mouth of the mass feed member and start rotating again after the mould cavity has been filled.

In an embodiment the installation comprises a pressurized air food product ejection system with a pressurized air source that is operable to feed pressurized air as ejection fluid at a regulated ejection air pressure thereof to group of cavities from which moulded food products are to be ejected in in a product release position of the mould member so as to facilitate and/or cause ejection of the moulded food product from the group of mould cavities at said product release position.

In an embodiment a controller is linked to a foodstuff mass feed and pressurization system which controller is adapted to input at least one target parameter related to the filling of the mould cavities with foodstuff mass via the mouth of the mass feed member, said at least one target parameter being one or more from:
  a target fill pressure for the foodstuff mass in the chamber of the mass feed member and/or in the mould cavity to be caused by said foodstuff mass feed and pressurization system, and/or
  a target volumetric flow rate for the foodstuff mass into the chamber of the mass feed member and/or into the mould cavity to be caused by said foodstuff mass feed and pressurization system, and/or
  a target rotational speed (RPM) of the mould drum.

In an embodiment the controller is adapted, e.g. a computerized controller is programmed, to automatically set the ejection fluid, e.g. air, pressure by the pressurized air source on the basis of the target parameter inputted into the controller.

In an embodiment the controller comprises a memory wherein a list of selectable foodstuff masses is stored, e.g. representing different ground meat products, and wherein the controller is adapted to input a selection of a foodstuff mass from said list of selectable foodstuff masses, and wherein the controller has a memory wherein predetermined combinations are stored of on the one hand at least each selectable foodstuff mass and said target parameter and on the other hand said automatically set ejection fluid pressure.

In an embodiment the controller comprises a memory wherein a list of selectable mould drums is stored, e.g. representing mould drums having differing mould cavities, and wherein the controller is adapted to input a selection of a mould drum from said list of selectable mould drums, and wherein the controller has a memory wherein predetermined combinations are stored of on the one hand at least each selectable mould drum and said target parameter and on the other hand said automatically set ejection air pressure.

In an embodiment the mass feed member has one or more flexible plates, preferably of plastic material, which in operation is/are held against the outer circumference of the drum under pressure that is produced by a pressure device, e.g. a pneumatic device, e.g. comprising pneumatically actuated rigid supports for the plate, e.g. beams or lamellae. A pneumatic cushion or actuator holding the flexible plate under pressure against the drum is for example embodied as an elongated inflatable member arranged between a rigid housing of the mass feed member or the device and the plate onto which it exerts pressure. Alternatively, the pneumatic cushion is embodied as a pneumatic cylinder. Preferably the beams or lamellae are positioned transversely with respect to the direction of rotation of the drum and are arranged between the pressure cushion and the plate. These lamellae or beams may provide lines with a high rigidity in the axial direction of the drum, while the plate is able to follow deviations in the diameter of the drum. In an embodiment, the flexible plate, as seen in the circumferential direction of the drum, extends on either side of the mouth of the mass feed member.

The invention also relates to a method for moulding of food products from a pumpable foodstuff mass, e.g. a mass as described herein, wherein use is made of an installation for moulding food products from a pumpable foodstuff mass comprising a moveable mould member as described herein.

The invention also relates to a method for manufacturing a moveable mould member which is configured for use in an installation for moulding products from a pumpable foodstuff mass, the mould member having an outer surface, in operation the mould member being movably supported to move in a direction of movement,
  the method of manufacturing comprising the steps of:
  providing at least one permeable mould body comprising:
    an outer surface forming at least part of the outer mould member surface, which outer surface of the permeable mould body is fluid tight;
    a permeable volume comprising fine openings,
  forming one or more recessed mould cavities in the outer surface of the mould body, defining a shape of the products which are to be moulded, the mould cavities having an opening in the mould member surface for the introduction of foodstuff mass into the mould cavity, the fine openings of the permeable volume opening out at the one or more mould cavities and wherein each mould cavity of the permeable mould body is delimited by a permeable volume,
  preparing in the mould member, for each group of mould cavities from which food products are to be ejected simultaneously, at least one ejection fluid inlet allowing the entry of pressurized fluid and multiple channels extending from said ejection fluid inlet to the permeable volumes of the group of mould cavities, the channels providing communication from the at least one ejection fluid inlet via the channels and via the permeable volumes into the mould cavities to assist in ejection of a product from a mould cavity, characterized by providing in the one or more permeable volumes distinct fluid flow resistances P1, P2 for a flow of pressurized ejection fluid entered via the ejection fluid inlet, in particular a relatively large first fluid flow resistance P1, and a relatively small second fluid flow resistance P2, and/or by providing multiple channels associated with one mould cavity, and providing the channels with distinct fluid flow resistances C1, C2 for a flow of pressurized ejection fluid entered via the ejection fluid inlet, in particular a relatively large first fluid flow resistance C1, and a relatively small second fluid flow resistance C2, and/or by providing a first and a section ejection fluid inlets for each group of mould cavities from which food products are to be ejected simultaneously, and one or more channels associated with the at least one first ejection fluid inlet and one or more channels associated with the at least one second ejection fluid inlet, such that channels extending from the associated at least one first ejection fluid inlet to a mould cavity allow a first flow of ejection fluid, which is separate from a second fluid flow of ejection fluid in channels extending from the associated at least one second ejection fluid inlet to the same one mould cavity.

BRIEF DESCRIPTION OF THE DRAWINGS

It is noted that the invention also envisages combining the various solutions and designs disclosed herein. For example, a solution related to the permeable body is combinable with a solution related to the channel(s) associated with the permeable body. Examples of such combinations are disclosed in the drawings and discussed below.

The invention will be further explained in relation to the drawings, in which:

FIG. 2*a* is a detailed perspective view of the mould drum of FIG. 1;

FIG. 2*b* represents a detail of FIG. 2*a*;

FIG. 3 is a cross-sectional view of the mould drum of FIG. 1;

FIG. 4 is a detail of a mould cavity of the mould drum of FIG. 3;

FIG. 5 is a detail of a mould cavity according to an aspect of the invention;

FIG. 6 shows a perspective detail of an alternative embodiment of a permeable mould body with a mould cavity;

FIG. 8*a* shows in a perspective view an alternative embodiment of a mould drum according to the present invention;

FIG. 8*b* shows a detail of FIG. 8*a*;

DETAILED DESCRIPTION OF VARIOUS EMBODIMENTS

Figure 1:
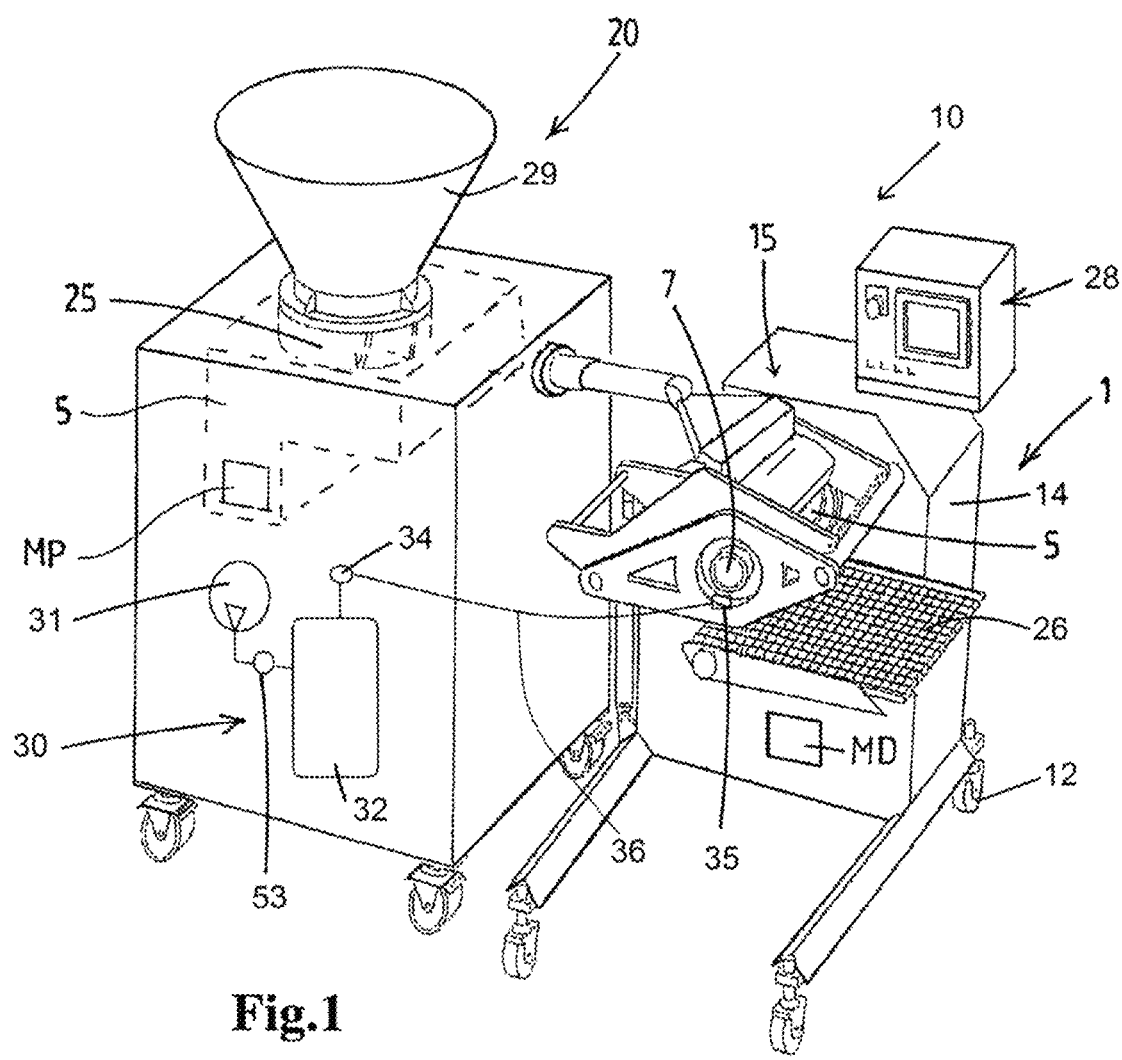
FIG. 1 is a perspective view of a rotary cylindrical mould drum in a moulding installation for moulding food products from a pumpable foodstuff mass.

In FIG. 1 a moulding installation 10 is shown. The installation is, for example, envisaged for the production of moulded food products from ground meat, e.g. ground poultry meat, ground beef, ground pork, mixtures of ground meat, etc. For example, the installation is embodied to mould patties, nuggets, drumsticks resembling meat products, or the like.

The installation comprises in this embodiment a moulding device 1 and a pump device 20, e.g. a meat pump device 20.

The moulding device 1 comprises a frame 14, here a wheeled frame with wheels 12 allowing to ride the device 1 over a floor of a production plant.

The device 1 further comprises a mould drum 16 having an outer circumferential drum surface 17 and a longitudinal drum rotation axis 7. The drum 16 is rotatably supported by the frame 14 to revolve about the drum rotation axis 7, here as preferred a horizontal axis 7.

In the outer circumferential drum surface 17 multiple recessed mould cavities are present, e.g. in rectilinear or helical lanes as described herein, each lane comprising a group of multiple cavities.

here in multiple circumferential series of multiple mould cavities each. Each mould cavity has a fill opening for introduction of foodstuff mass into the mould cavity.

A mould drum drive 15 is coupled to the drum 16 to drive the drum in a rotation direction D, e.g. at a constant speed or in some other fashion, e.g. intermittently or with variable speed, e.g. slow or stopped when filling of a row of mould cavities takes place and faster in between two successive lanes of mould cavities.

A mass feed member 18 is arranged at a fill position relative to the outer circumferential drum surface. This mass feed member has a chamber 23 with an inlet for foodstuff mass to introduce said foodstuff mass into the chamber and with a mouth facing the drum surface 17. The mass feed member 18 is adapted to transfer foodstuff mass into passing mould cavities of the revolving mould drum 16, e.g. in a lane per lane manner, when the fill opening of a mould cavity, or of a lane of mould cavities, is in communication with the mouth at this fill position. The foodstuff mass forms a food product in the mould cavity.

The mouth can, for example, have the shape of an elongated, e.g. straight slot, extending parallel to the drum axis 7, wherein the width of the slot is smaller than the corresponding circumferential dimension of the mould cavities.

In another, known, embodiment the mouth is embodied with an orificed outlet structure having multiple orifices, e.g. over a surface that matches approximately the size of the filling opening of the mould cavity. In an embodiment with an orificed mouth having a multitude of orifices to fill the passing cavities, e.g. arranged in rows or otherwise, the pressure to be exerted on the mass may be relatively high due to the resistance that the mass experiences when passing through the orifices.

As part of a foodstuff mass feed and pressurization system of the installation the pump device 20 comprises a pump 25 with drive motor MP, e.g. an electrically driven, variable RPM, rotary vane pump as schematically depicted here.

The installation may comprise a hopper 29 into which the foodstuff mass is introduced, e.g. batches of ground meat mass. The hopper 29 is connected to the inlet of the pump 25. In an embodiment the hopper 29 is equipped with one or more augers to advance the mass to said pump inlet.

The pump P feeds the mass to the inlet of the mass feed member, and in this example, in absence of any other means that can pressurize the mass before transfer into the mould cavity, this pump P controls the pressure of the mass in the chamber. The mass then flows via the mouth in the mould cavities, e.g. into a lane of mould cavities.

In embodiments the mass feed member mouth may be a single elongated slot shaped mouth, e.g. spanning the series of mould cavities on the drum. In other embodiments the mouth may be an orificed mouth formed by a multitude of outlet orifices so that rather small substreams of mass enter into the mould cavity. Other embodiments of the mouth are also possible.

In the vicinity of the underside of the moulding drum 16, there is a discharge belt 26 on which ejected food products drop from the drum 16 and via which the ejected products can be conveyed onwards. For example, the products are then fed to one or more of a coating device, an oven, a freezer, and/or a packaging installation.

The moulding installation 10 also comprises a controller 28 configured to control the various components and functions of the installation.

The food products ejection system of the installation 10 in this example comprises a pressurized air source 30, e.g. a compressor 31 with a pressurized air storage tank 32 and a pressure regulating valve 33 (not on the drawings) and an air control valve 34 at the outlet of the tank 32. This source 30 is operable to feed pressurized air at a regulated ejection air pressure thereof to an air emitter 35 that is arranged near the revolving drum 16, here at a head end thereof. In operation the ejection fluid inlets of the drum sequentially pass the air emitter 35 and align therewith; the valve 34 is then briefly opened to emit a burst of air into the inlet and the connected channel(s). This air then flows out of permeable surface of the permeable volume and, as is known in the field, facilitates and/or causes ejection of the moulded food product from the one or more mould cavities at the product ejection or release position.

The computerized controller 28 of the installation is linked, e.g. by cable and/or wireless, to the pump device 20. The controller 28, e.g. via a touchscreen with graphic user interface, is adapted to allow for inputting, e.g. by an operator of the installation, of at least one target parameter related to filling of the mould cavities with the foodstuff mass via the mouth of the mass feed member. The mentioned at least one target parameter that can be inputted into the controller 28 is for example:

a target fill pressure for the foodstuff mass in the chamber of the mass feed member and/or in the mould cavity to be caused by said foodstuff mass feed and pressurization system, here by operation of the pump 25, and/or a target volumetric flow rate for the foodstuff mass into the chamber of the mass feed member and/or into the mould cavity to be caused by said foodstuff mass feed and pressurization system, and/or a target rotational speed (RPM) of the mould drum.

The computerized controller 28 may be programmed, e.g. on the basis of dedicated software loaded and run on the computer, to automatically set an ejection air pressure by the pressurized air source 30 on the basis of an inputted target parameter.

An embodiment of the mass feed member 18 and the drum surface 17 with multiple recessed mould cavities 60 is shown in more detail in FIGS. 2-4.

The mass feed member 18 is shown in operation, arranged at a fill position relative to the drum surface 17. The mass feed member has a chamber 23 with an inlet for foodstuff mass to introduce said foodstuff mass into the chamber and with a mouth 24 facing the drum surface 17, said mass feed member being adapted to transfer mass into passing mould cavities 60 of the rotating mould drum when an opening of a mould cavity is in communication with the mouth 24 at said fill position, said mass forming a food product in said mould cavity.

The mould cavities 60 each have an opening 61 in the drum surface 17 of the mould drum 16 for the introduction of foodstuff mass into the mould cavity, and for the ejection of the moulded product.

The shown embodiment of the mass feed member 18 has one or more flexible plates 18*a*, preferably of plastic material, which in operation is/are held against the outer circumference 17 of the drum under pressure that is produced by a pressure device, e.g. a pneumatic device, e.g. comprising pneumatically actuated rigid supports for the plate 18*a*, e.g. lamellae 18*b*.

A pneumatic cushion or actuator holding the flexible plate 18*a* under pressure against the drum is for example embodied as an elongated inflatable member arranged between a rigid housing of the mass feed member or the device 1 and the plate 18*a* onto which it exerts pressure. Alternatively, the pneumatic cushion is embodied as a pneumatic cylinder. Preferably the beams or lamellae 18*b* are positioned transversely with respect to the direction of rotation of the drum and are arranged between the pressure cushion and the plate 18*a*. These lamellae may provide lines with a high rigidity in the axial direction of the drum, while the plate 18*a* is able to follow deviations in the diameter of the drum.

In the shown embodiment, the flexible plate 18*a*, as seen in the circumferential direction of the drum, extends on either side of the mouth 24.

In the embodiment shown in FIGS. 2*a*-5, the cylindrical mould drum 16 comprises multiple porous mould bodies 44. Rectangular recesses 42 are provided in the outer circumference 17 of the moulding drum 16. Exchangeable porous mould bodies 44, also referred to as inserts, of corresponding dimensions can be secured in these recesses 42.

Here bores 46 are provided at the corners of an insert 44, aligned with threaded holes 47 in a base 48 of the recess 42, and bolts 50 can be fitted into them. Mould body 44 comprises the mould cavity 60 delimited by permeable volume 44a, while spacer 62 is a flat plate in which there is a through-opening 72, the dimensions of which are larger than the mould cavity 60.

The porous mould bodies 44 each have a curved outer surface 44b forming at least part of the outer circumferential drum surface, which curved outer surface of the permeable mould body is fluid tight. The porous mould bodies of the embodiment of FIGS. 2a-5 each comprise only one mould cavity 60, surrounded by a permeable volume 44a comprising fine openings opening out at the mould cavity 60, such that each one of the mould cavities of the permeable mould body is delimited at least in part by a permeable volume. As explained herein, in embodiments a mould body may well have multiple mould cavities therein, e.g. in a lane of cavities.

The rotary cylindrical mould drum 16 further comprises multiple ejection fluid inlets 54, each associated with a mould cavity or a lane of cavities 60. The inlets 54 are here provided at head end 56 of the drum.

When an ejection fluid inlet 54, due to revolving of the drum 16, arrives at the location of the air emitter 35 that is connected via line 36 to the rest of the system 30, the inlet 54 is fed with a burst of pressurized ejection fluid, here compressed air. This burst can be governed by a valve or be the result of the inlet 54 coming into communication with the emitter 35.

Channels 76, of which examples are visible in the cross-sectional view in FIGS. 3 and 4, extend from said at least one ejection fluid inlet 54 to the permeable volumes 44a. The channels 76 provide communication from the at least one ejection fluid inlet 54 via the channels 76 and via the permeable volumes 44a into the mould cavities 60 to assist in ejection of the moulded product 78 from a mould cavity 60.

The ejection fluid inlet 54 allows the entry of pressurized fluid with a volumetric flow rate, which volumetric flow rate naturally decreases over the number and length of the channels, and through the permeable volume.

In the embodiment of FIGS. 2a and 2b, in the base 48 of a recess 42 there is an opening 52 which is in communication, via a channel 76, with an ejection fluid inlet 54 at a head end 56 of the moulding drum 16.

According to an aspect of the invention, the permeable volume 44a delimiting cavity 60 has a first fluid flow resistance P1 for a flow of ejection fluid into a trailing zone TZ of the cavity, which is larger than a second fluid flow resistance P2 for a flow of ejection fluid into a leading zone LZ of the cavity 60, seen in the direction of rotation D. As such the volumetric flow rate in the leading zone of the cavity is higher than in a trailing zone of the cavity, resulting in more efficient use of ejection fluid.

In particular, as shown in FIG. 4, the porosity within the permeable volume 44a delimiting cavity 60 decreases from the leading zone LZ of the cavity, to a decreased porosity in the trailing zone TZ of the cavity seen in the direction of rotation D. In addition to, or as an alternative to the decreasing porosity, it is also possible to increase the pore density within the permeable volume delimiting the cavity from the leading zone to the trailing zone.

This is also shown in detail in the permeable mould body 44 shown in FIG. 5. The recessed mould cavity 60 is delimited by permeable volume 44a. Fine openings 73 open out at the mould cavity, in the shown embodiment at vertical walls 66 and base 68 of the mould cavity 60. Irregularly shaped mould cavities will not have a distinct wall and base.

The porosity is relatively high in the leading zone LZ of the cavity, and relatively low at the trailing zone TZ of the cavity.

In FIG. 6 an alternative embodiment of a permeable mould body 144 with mould cavity 160 is shown. The moulding drum 116 illustrated in this drawing comprises a support member 150, which is provided in its outer wall with recesses 142 which have a widened base 148, extending in the longitudinal direction. Into the recesses 142 inserts 144 with correspondingly widened base 145 and with a mould cavity 160 can be pushed from an end of the moulding drum 116.

Figure 7A:
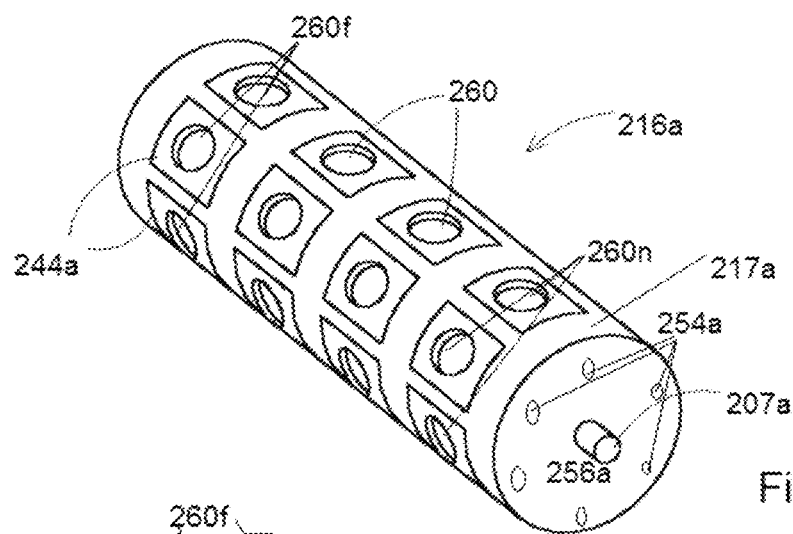
FIGS. 7*a*, 7*b* and 7*c* show in a perspective view alternative embodiments of mould drums according to the present invention.
Figure 7B:
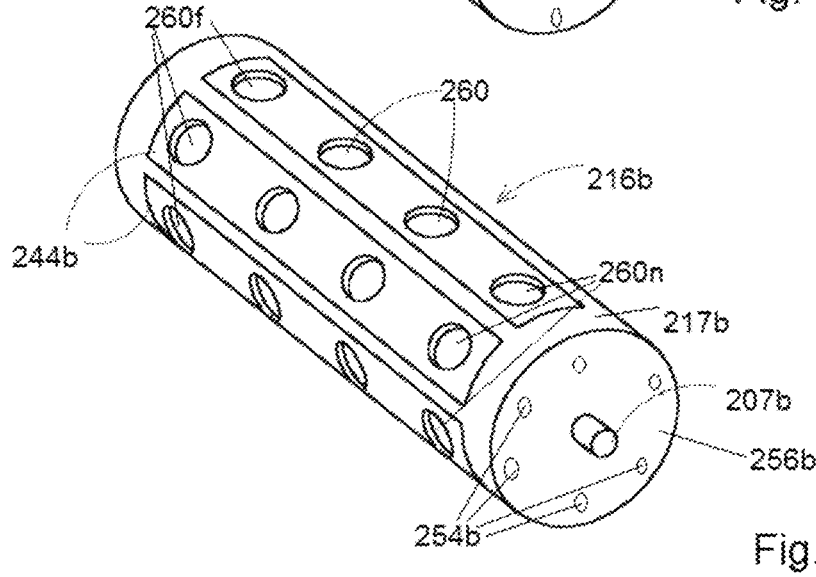
Figure 7C:
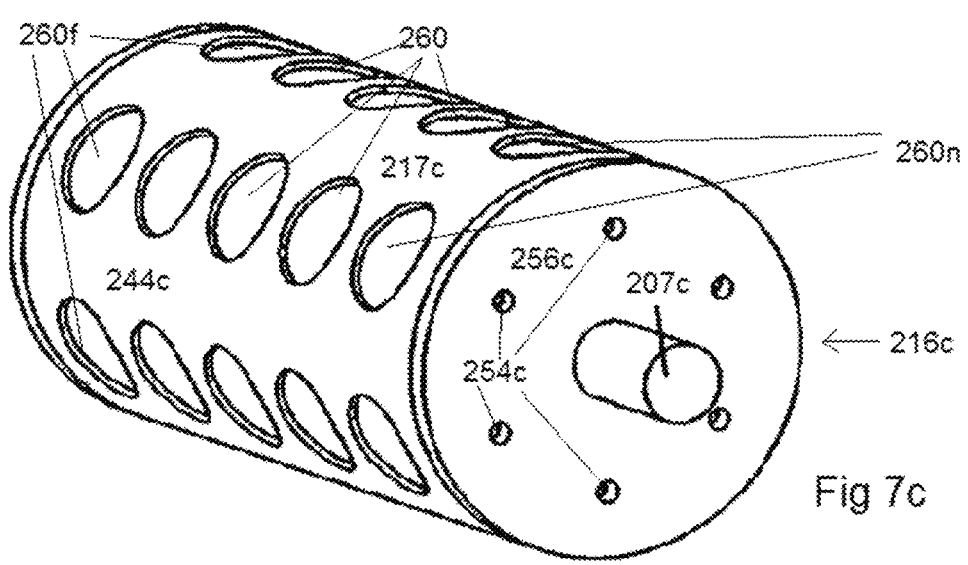

FIGS. 7a, 7b and 7c show yet alternative embodiments of mould drums 216a, 216b and 216c according to the present invention. The mould drums have an outer circumferential drum surface 217a, 217b, 217c, and a longitudinal drum rotation axis 207a, 207b, 207c respectively.

In the drum surfaces, multiple recessed mould cavities 260 are provided. The mould cavities 260 are arranged in the outer drum surface in a mould cavities pattern with lanes of cavities at multiple, here 6, longitudinal positions when seen in longitudinal direction of the mould drum, and circular arrays of cavities at multiple, here 4 or 5, circumferential positions when seen in the direction of rotation D of the mould drum.

The mould drums of FIGS. 7a-7c differ in that in FIG. 7a, 24 (6×4) porous mould bodies 244a are provided, each being provided with a single mould cavity 260. In FIG. 7b, 6 porous mould bodies 244b are provided, each being provided with a lane of 4 mould cavities 260. In FIG. 7c, a single mould body 244c is provided, in which all mould cavities 260 are provided.

The rotary cylindrical mould drum 216a, 216b, 216c further comprise each 6 ejection fluid inlets 254a, 254b, 254c associated with a group of mould cavities from which food products are to be ejected simultaneously. Here, the ejection fluid inlets are provided at head ends 256a, 256b, 256c of the drums. These openings 254a, 254b, 254c are alternately in communication with excess-pressure means (not shown), such as a compressor, for supplying an ejection fluid.

One or more channels, not visible, extend from each ejection fluid inlet 254a, 254b, 254c, below the lanes of cavities, to the permeable volumes of the mould bodies 244a, 244b, 244c. The channels provide communication from the ejection fluid inlets via the channels and via the permeable volumes into the mould cavities 260 to assist in ejection of the moulded product from a mould cavity.

According to an aspect of the invention, the configuration of channels and mould cavities is such that a first fluid flow resistance P1 in a permeable volume delimiting a cavity 260n 'nearest' to the ejection fluid inlet is larger than a second fluid flow resistance P2 in a permeable volume delimiting a cavity 260f 'furthest' from the ejection fluid inlet, thereby compensating for the decrease in volumetric flow rate over the length of a fluid channel, to have more efficient use of ejection fluid.

For example, the porosity of the permeable volumes increases, and/or the pore density of the permeable volumes decreases, from cavities 260n 'nearest' to the ejection fluid inlet, to cavities 260f 'furthest' from the ejection fluid inlet, such that the fluid flow resistance decreases in this direction, thereby compensating for the decrease in volumetric flow rate over the length of a fluid channel, to have more efficient use of ejection fluid.

In the shown configuration, in each lane of cavities one cavity 260n is 'nearest' to the ejection fluid inlet 254a, 254b, 254c, and one cavity 260f is 'furthest' from the ejection fluid inlet.

FIGS. 8a and 8b show an alternative embodiment of a mould drum 416 according to the present invention. The mould drum 416 has an outer circumferential drum surface 417 and a longitudinal drum rotation axis 407. In the drum surface 417, multiple recessed mould cavities 460 are provided. 9 lanes of cavies are provided, and 4 circular arrays of cavities are provided. A single permeable mould body 444 is provided, having a curved outer surface 444b (not in figures) forming the outer circumferential drum surface 417, and a permeable volume 444a. Furthermore, an inner support member 480 is provided, around which the mould body 444 is provided.

The rotary cylindrical mould drum 416 comprises 9 ejection fluid inlets 454, each associated with a lane of cavities which are to be ejected simultaneously, and which are provided at head end 456 of the drum. Upon rotation of the drum, these openings 454 are alternately in communication with excess-pressure means (not shown), such as a compressor, for supplying a forcing fluid.

Channels 476 extend from said ejection fluid inlets 454 at an outer surface of the inner support member 480 and below each lane of cavities, to the permeable volumes 444a. This is shown in detail in FIG. 8b. The channels provide communication from the ejection fluid inlets via the channels and via the permeable volumes into the mould cavities 460 to assist in ejection of the moulded product from a mould cavity.

According to an aspect of the invention, a first fluid flow resistance P1 in a permeable volume delimiting a cavity 460n 'nearest' to the ejection fluid inlet is larger than a second fluid flow resistance P2 in a permeable volume delimiting a cavity 460f 'furthest' from the ejection fluid inlet, thereby compensating for the decrease in volumetric flow rate over the length of a fluid channel, to have more efficient use of ejection fluid.

In the shown embodiment, the fluid flow resistance gradually decreases from a large first fluid flow resistance P1, to a relatively smaller fluid flow resistance P1*, to a relatively smaller fluid flow resistance P1**, to a lowest second fluid flow resistance P2 delimiting cavity 460f 'furthest' from the ejection fluid inlet.

For example, the porosity of the permeable volumes 444a of the mould body increases from cavities 460n 'nearest' to the ejection fluid inlet, to cavities 460f 'furthest' from the ejection fluid inlet, such that the fluid flow resistance decreases in this direction, thereby compensating for the decrease in volumetric flow rate over the length of a fluid channel.

Figure 9A:
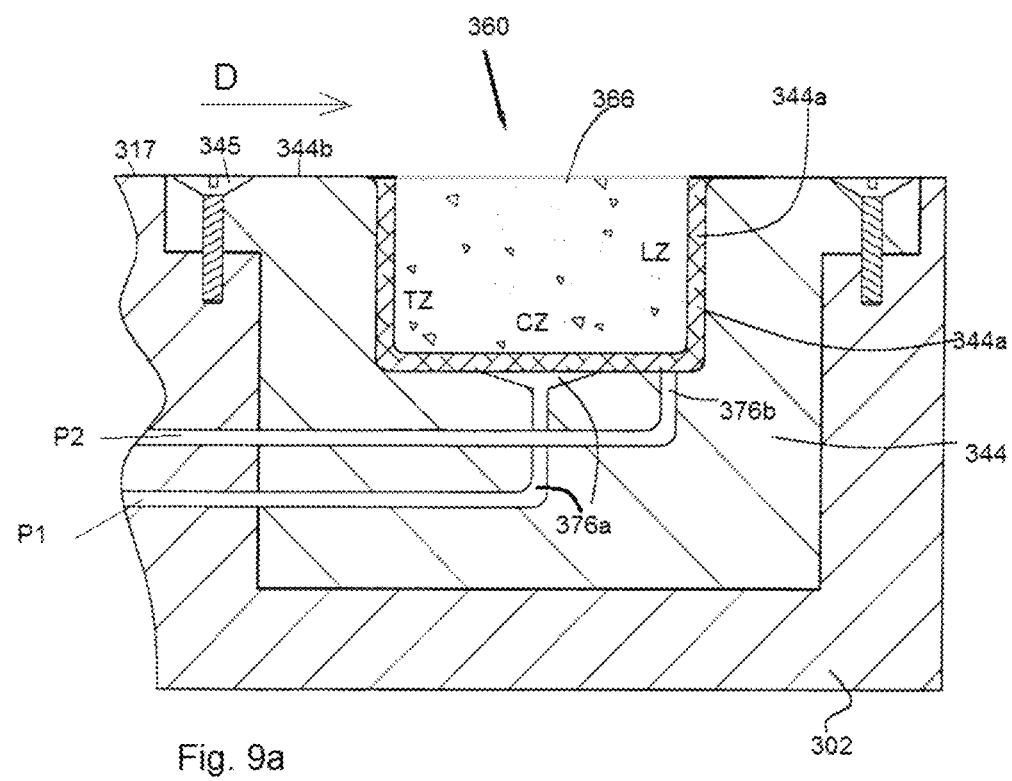
FIGS. 9*a* and 9*b* show in cross section detail of yet alternative configurations of a mould drum according to the invention.

In FIG. 9a, a detail of yet another configuration of a mould drum according to the invention is partially shown. Visible is part of the drum surface 317, in which a recessed mould cavity 360 is provided, here filled with foodstuff mass 366. The mould drum comprises a drum member 302 in which a permeable mould body 344 is mounted with bolts 345, which mould body 344 is provided with an outer surface 344b forming part of the outer drum surface 317. One mould cavity 360 is provided in the permeable mould body 344, surrounded by a permeable volume 344a comprising fine openings opening out at the mould cavity.

According to an aspect of the invention, the configuration of channels and mould cavities is such that multiple channels, here 2, are associated with a mould cavity. Two channels 376a, 376b are provided, extending from two ejection fluid inlets (not shown) to the permeable volume 344a.

For example, the higher volumetric flow rate in the leading zone LZ of the cavity 360 is achieved by not providing a channel below the trailing zone TZ. Alternatively, or in addition, it is possible to provide a throttle or the like (not shown) in channel 376a. The first channel 376a extending to a central zone CZ of the cavity then has a first fluid flow resistance C1, which is larger than a second fluid flow resistance C2 in a second channel 376b extending to a leading zone LZ of the cavity, seen in the direction of rotation D, thereby providing a decreased volumetric flow rate at the trailing zone and an increased flow rate in a leading zone of the cavity to have more efficient use of ejection fluid.

Figure 9B:
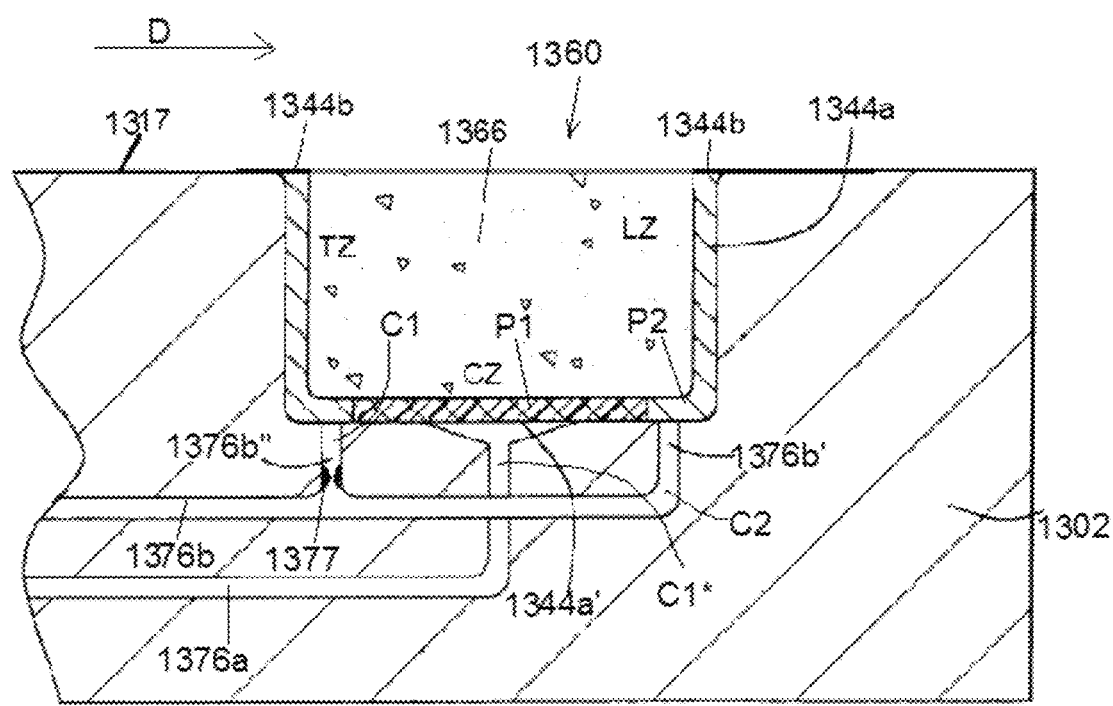

In FIG. 9b, a detail of yet another configuration of a mould drum according to the invention is shown. Visible is part of the drum surface 1317, in which a recessed mould cavity 1360 is provided, here filled with foodstuff mass 1366. The mould drum comprises a drum member 1302 in which a permeable mould body 1344 is mounted, which mould body 1344 is provided with a curved outer surface 1344b forming part of the outer circumferential drum surface 1317. One mould cavity 1360 is provided in the permeable mould body 1344, surrounded by a permeable volume 1344a comprising fine openings opening out at the one or more mould cavities.

According to an aspect of the invention, the permeable volume 1344a delimiting cavity 1360 has a first fluid flow resistance P1 delimiting a central zone CZ of the cavity, which is larger than a second fluid flow resistance P2 delimiting a leading zone LZ of the cavity 460, seen in the direction of rotation D. Hence, there is an increased volumetric flow rate at the leading zone LZ.

In addition, according to another aspect of the invention, the configuration of channels and mould cavities is such that multiple channels are associated with the mould cavity 460. Two channels 1376a, 1376b are provided, extending from two ejection fluid inlets (not shown) to the permeable volume 1344a. Channel 1376b splits into a channel part 1376b' extending to the leading zone LZ of the cavity 1360, and a channel part 1376b" extending to a trailing zone TZ of the cavity 460. Channel 1376a extends to the central zone of the cavity. Channel part 1376b" is provided with a throttle 1377.

This configuration is such that channel part 1376" extending to the trailing zone TZ of the cavity has a large fluid flow resistance C1. The fluid flow resistance C1 of channel 1376b" and permeable volume 1344a results in a relatively large fluid flow resistance at the trailing zone, which is larger than the fluid flow resistance at the central zone, formed by first fluid flow resistance P1 of the permeable volume 1344a and the fluid flow resistance C1* of channel 1376a, which in turn is larger than the fluid flow resistance at the leading zone, formed by second fluid flow resistance P2 in the permeable volume and the flow resistance C2 of channel 1376b'.

Hence, the volumetric flow rate decreases from the leading to the trailing zone, to have more efficient use of ejection fluid.

Figure 9C:
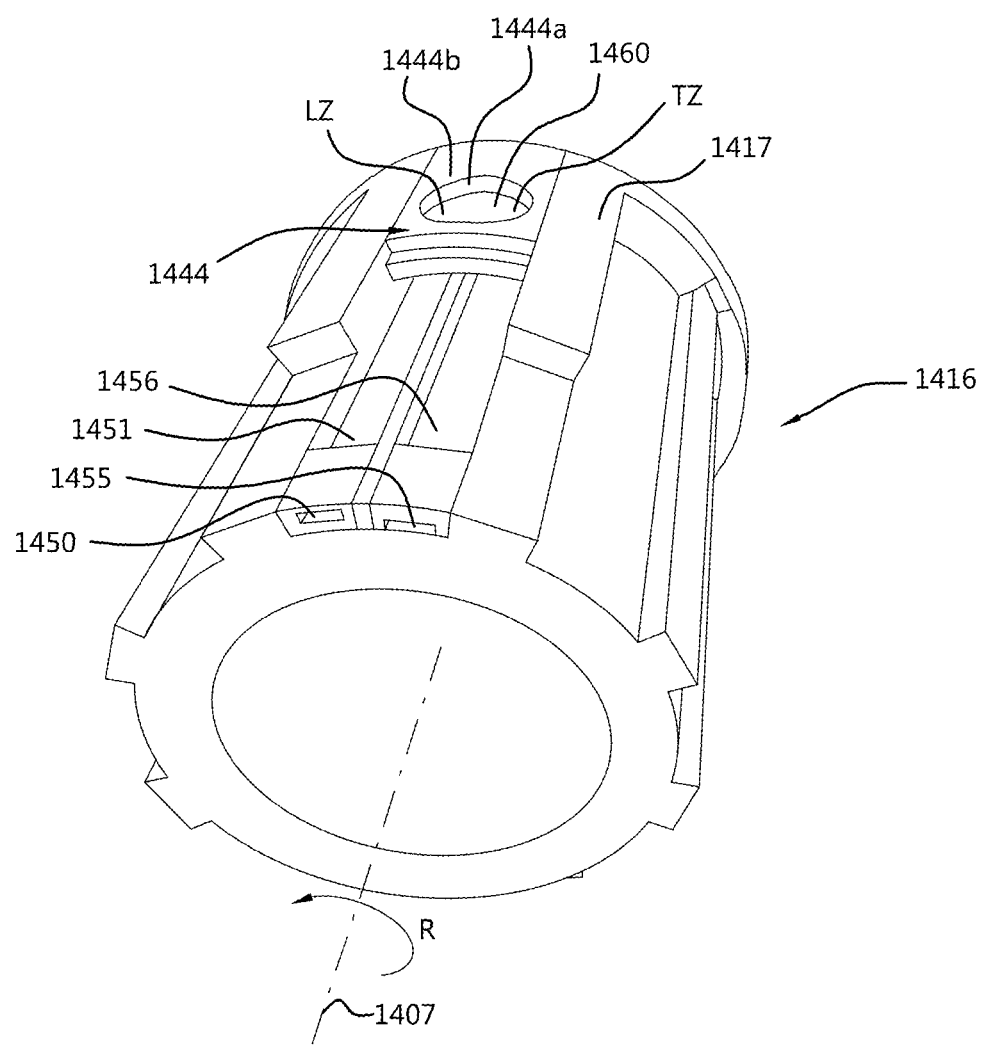
FIG. 9*c* shows schematically an alternative configuration of a mould drum according to the invention.

FIG. 9c shows schematically an alternative configuration of a mould drum according to the invention. A movable mould member 1416 is shown, configured for use in an installation for moulding food products from a pumpable foodstuff mass. The mould member has an outer surface 1417. In operation the mould member 1416 is rotatably supported to revolve about a drum rotation axis 1407 in a direction of rotation R.

The mould member 1416 has in the outer surface 1417 multiple recessed mould cavities 1460, only one of which is shown. The mould member 1460 has at least one permeable mould body comprising an outer surface 1444b forming at least part of the outer mould member surface 1417, which outer surface of the permeable mould body is fluid tight. The permeable mould body 1444 further comprises the mould cavity 1460 and a permeable volume 1444a comprising fine openings opening out at the one or more mould cavities, such that each mould cavity of the permeable mould body is delimited at least in part by a permeable volume.

The mould member 1416 further comprises, for each group of mould cavities from which food products are to be ejected simultaneously:
- at least one first ejection fluid inlet 1450 allowing the entry of ejection fluid, and
- at least one second ejection fluid 1455 inlet allowing the entry of ejection fluid, and one channel 1451 associated with the first ejection fluid inlet 1450 extending from the first ejection fluid inlet 1450 to the one or more permeable volumes 1444a of the group of mould cavities,
- one channel 1456 associated with the second ejection fluid inlet 1455 extending from the second ejection fluid inlet 1455 to the one or more permeable volumes 1444a of the group of mould cavities.

The channels 1451, 1456 provide communication from the associated ejection fluid inlets 1450, 1455 via the channels and via the permeable volumes into the mould cavities to assist in ejection of the moulded products from the group of mould cavities.

Each of the first and second ejection fluid inlet 1450, 1455 allows the entry of ejection fluid. The configuration of the first and second ejection fluid inlet 1450, 1455, associated channels 1451, 1456, permeable volumes 1444a, and group of mould cavities from which food products are to be ejected simultaneously is such that channel 1451 extending from the associated first ejection fluid inlet 1450 to a mould cavity allows a first flow of ejection fluid, which is separate from a second fluid flow of ejection fluid in the channel 1456 extending from the associated second ejection fluid inlet 1455 to the same one mould cavity.

In the example shown in FIG. 9c, channel 1451 extending from the associated first ejection fluid inlet 1450 extends to a leading zone (LZ) of the mould cavity 1460, and channel 1456 extending from the associated second ejection fluid inlet 1450 into a trailing zone (TZ) of the same one mould cavity, seen in the direction of movement (M).

Figure 9D:
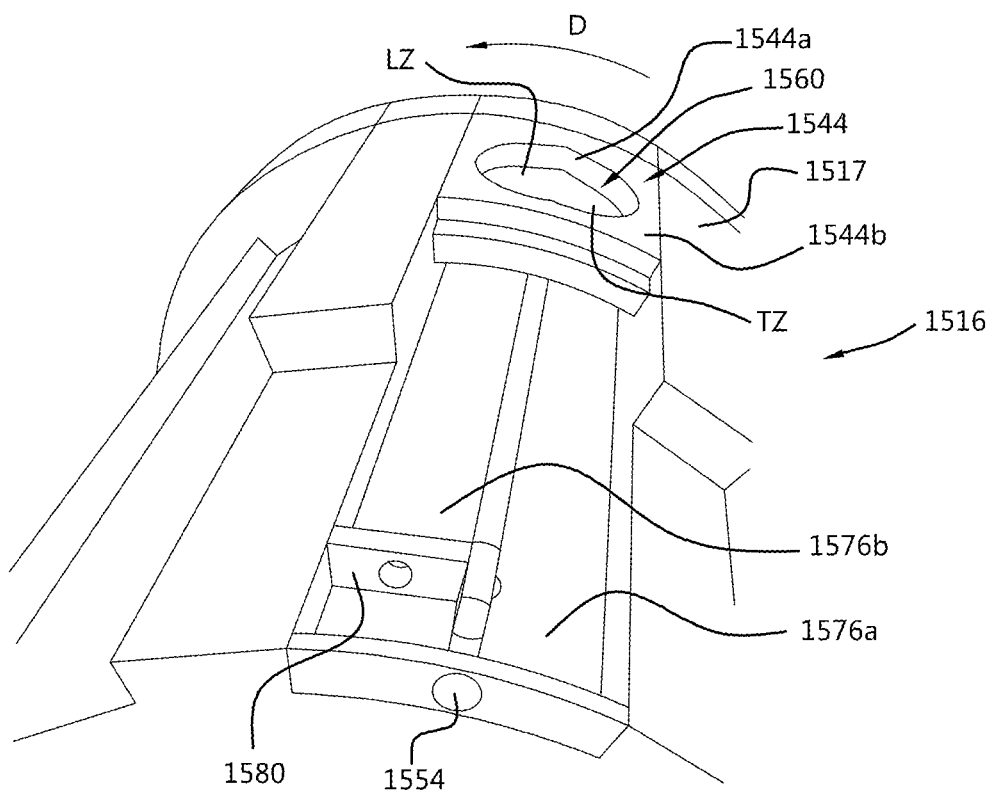
FIG. 9*d* shows schematically an alternative configuration of a mould drum according to the invention, FIGS. 10*a*, 10*b*, 10*c*, 10*d*, and 10*e* schematically show in cross section part of a mould drum with a mould cavity according to different aspects of the present invention.

FIG. 9d shows schematically an alternative configuration of a mould drum 1516 according to the invention. The mould member 1516 has an outer surface 1517 and a longitudinal drum rotation axis. In operation the mould member 1516 is rotatably supported in the installation to revolve about the drum rotation axis in a direction of rotation D.

The mould member 1516 has in the surface 1517 multiple recessed mould cavities 1560, only one of which is shown. The mould member 1516 has at least one permeable mould body 1544 comprising an outer surface 1544b forming at least part of the outer mould member surface 1517, which outer surface of the permeable mould body is fluid tight. The permeable mould body 1544 further comprises a mould cavity 1560 and a permeable volume 1544a comprising fine openings opening out at the mould cavity.

The mould member further comprises, for each group of mould cavities from which food products are to be ejected simultaneously, at least one ejection fluid inlet allowing the entry of pressurized fluid. Here one ejection fluid inlet 1554 is provided for each group of mould cavities. From the ejection fluid inlet 1544 two channels 1576a, 1576b extend to the permeable volume 1544a of the group of mould cavities. The channels 1576a, 1576b provide communication from the associated ejection fluid inlet 1554 via the channels 1576a, 1576b and via the permeable volume 1544a into the mould cavity 1560 to assist in ejection of the moulded products.

In the shown example, the configuration of the ejection fluid inlet 1554 and associated channels 1576a, 1576b, permeable volume 1544a, and group of mould cavities from which food products are to be ejected simultaneously is such that two channels 1576a, 1576b are associated with one mould cavity 1560.

A first channel 1576a extends from the ejection fluid inlet 1544 to a trailing zone TZ of the mould cavity. This first channel 1576a has a first fluid flow resistance for a flow of ejection fluid, which is different from, e.g. larger than, a second fluid flow resistance C2 for a flow of ejection fluid in a second channel 1576b extending from the inlet 1544 to a leading zone LZ of the same one mould cavity 1560, seen in the direction of movement D. Here, the difference in fluid flow resistance is created by a narrowing 1580.

In FIGS. 10a-10e, schematically and in cross-section part of a mould cavity, permeable volume and part of the channels of a mould drum according to various aspects of the present invention are shown.

In FIGS. 10a-10e, a drum surface 517 is shown in which a mould cavity 560a, 560b is provided. The mould cavity is delimited by a permeable volume 544a of a mould body, having a curved outer surface 544b forming part of the outer circumferential drum surface 517. Multiple channels 575 are provided in a drum body 503 below the mould cavity, providing communication between an ejection fluid inlet, not shown, via permeable volume 544a to the mould cavity.

The configuration of multiple fluid channels 575 and permeable volume 544a below one mould cavity 560 is such that there are first zones FZ, having a relatively short fluid path length through the permeable volume 544a between the fluid channels 575 and the mould cavity 560. Other zones OZ have a relatively long fluid path length between a fluid channel and the same mould cavity. Also, directly above the fluid channels the path length is shorter than the diagonal path length to the cavity diagonally above the fluid channels 575. Short path lengths have a relatively low fluid flow resistance and long path lengths have a relatively high fluid flow resistance.

Figure 10A:
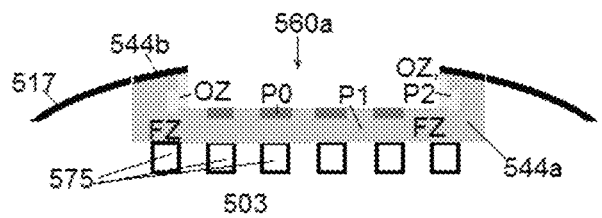

In the embodiment shown in FIG. 10a, the permeable volume 544a comprises three distinct fluid flow resistances within the permeable volume, labelled P1, P2 and P3. The fluid flow resistances are tuned to the path lengths:
- a high fluid flow resistance P1 is provided in first zones FZ, having a relatively short fluid path;
- a lower second fluid flow resistance P2 is provided in the other zones OZ of the permeable volume, having a relatively long path length; and
- an even higher fluid flow resistance P0 in the zones having a very short path length, directly above the channels 575.

As such, the distinct fluid flow resistances at least partly compensate for the variation in volumetric flow rate originating from the distinct path lengths, and attribute to a more uniform fluid flow rate within the same cavity.

A relatively large fluid flow resistance P1 of the permeable volume is e.g. caused by a relatively low porosity and/or a relatively high pore density of the permeable volume.

Figure 10B:
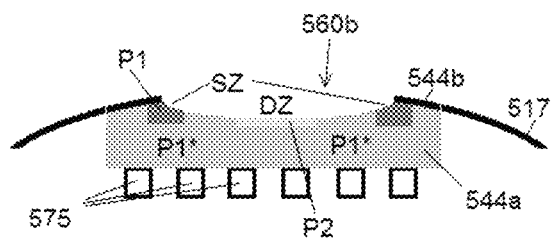

In the embodiment shown in FIG. 10b, mould cavity 560b has a relatively shallow zone SZ relative to an imaginary curved plane of the fill opening at the edge adjacent the drum surface, and relatively deep zone DZ in a central zone thereof. The permeable volume 544a delimiting mould cavity 560b comprises three distinct fluid flow resistances for a flow of pressurized ejection fluid within the permeable volume, labelled P1, P2 and P3. The fluid flow resistances are tuned to the mould cavity 560b:
  a larger first fluid flow resistance P1 for a flow of pressurized ejection fluid into the shallow zone SZ of the cavity,
  a smaller second fluid flow resistance P2 for a flow of pressurized ejection fluid into the deep zone DZ of the cavity,
  an intermediate fluid flow resistance P1* for a flow of pressurized ejection fluid into the other zones of the permeable volume 544a.

As a result, a relatively low volumetric flow rate is present at the shallow zones. It is advantageous to have a relatively low volumetric flow rate in the shallow portions, to create less damage to the products. The fluid flow resistance in the permeable volume 544a thus increases from the shallow zones to the deep zone.

Figure 10C:
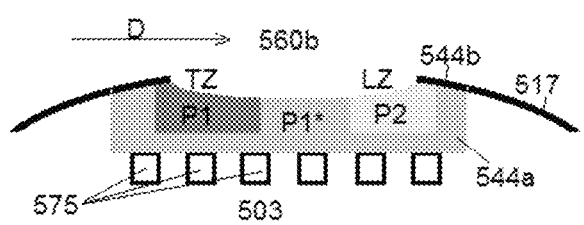
Figure 10D:
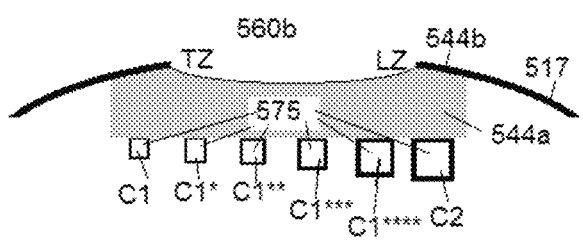

In the embodiment shown in FIG. 10c, mould cavity 560b has a leading zone LZ, and a trailing zone TZ, seen in the direction of rotation D. The permeable volume 544a delimiting mould cavity 560b comprises three distinct fluid flow resistances within the permeable volume, labelled P1, P2 and P3. The fluid flow resistances are tuned to the mould cavity 560b:
  a larger first fluid flow resistance P1 for a flow of ejection fluid into a trailing zone TZ of the cavity,
  a smaller second fluid flow resistance P2 for a flow of ejection fluid into the leading zone DZ of the cavity,
  an intermediate fluid flow resistance P1* for a flow of ejection fluid into the other zones of the permeable volume 544a.

As a result, a relatively high volumetric flow rate is present at the leading zone. It is advantageous to have a relatively high volumetric flow rate at the leading zone and a decreased volumetric flow rate at the trailing zone, to have more efficient use of ejection fluid.

Figure 10E:
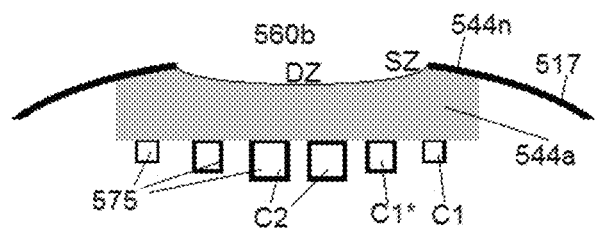

In the embodiment shown in FIG. 10e, mould cavity 560b has a deep zone DZ, and a relatively shallow zone SZ relative to an imaginary curved plane of the fill opening. Multiple channels 575 are associated with one mould cavity, wherein:
  a first channel extending to a shallow zone SZ of the one mould cavity has a first fluid flow resistance C1 for a flow of ejection fluid,
  a second channel extending from the at least one inlet to a deep zone DZ of the same one mould cavity, having a smaller second fluid flow resistance C2 for a flow of ejection fluid,
  an intermediate channel extends to an intermediate zone of the same mould cavity, having an intermediate fluid flow resistance C1*.

As a result, a relatively low volumetric flow rate is created at the shallow zones, causing less damage to the products.

In FIG. 10e, six channels 575 are associated with one mould cavity 560b, each having a different flow resistance for a flow of ejection fluid. In particular:
  a first channel extending from the at least one ejection fluid inlet to a trailing zone TZ of the one mould cavity has a first fluid flow resistance C1 for a flow of ejection fluid,
  a second channel extending from the at least one inlet to a leading zone LZ of the same one mould cavity, seen in the direction of rotation (D), has a smaller second fluid flow resistance C2 for a flow of ejection fluid,
  intermediate channels have intermediate fluid flow resistances C1*, C1, C1*, C1****, wherein C1>C1*>C1>C1*>C1****>C2.

As such, a relatively low volumetric flow rate is created at the trailing zone to have more efficient use of ejection fluid.

Figure 11:
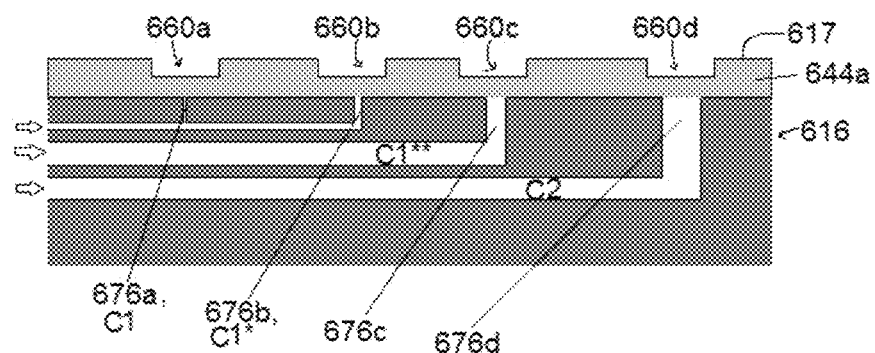
FIG. 11 schematically shows a cross section of part of a mould drum with mould cavities according to an aspect of the present invention.

In FIG. 11, part of a mould drum 616 with drum surface 617 is shown schematically in cross section. A permeable volume 644a delimits mould cavities. Multiple channels extend from 3 ejection fluid inlets to the permeable volumes. In particular:
  channel 676a extends from an ejection fluid inlet to a mould cavity 660a 'nearest' to the ejection fluid inlet, having a first fluid flow resistance C1 for a flow of ejection fluid to mould cavity 660a;
  channel 676b extends from the same ejection fluid inlet to a mould cavity 660b, having a fluid flow resistance C1* for a flow of ejection fluid to mould cavity 660b;
  channel 676c extends from an ejection fluid inlet to a mould cavity 660c, having a fluid flow resistance C1** for a flow of ejection fluid to mould cavity 660c;
  channel 676d extends from an ejection fluid inlet to a mould cavity 660d 'furthest' to the ejection fluid inlet, having a second fluid flow resistance C2 for a flow of ejection fluid to mould cavity 660d.

This configuration with distinct fluid flow resistances C1, C1*, C1** and C2 at least partially compensates for the decrease in volumetric flow rate over the length of a fluid channel, to have more efficient use of ejection fluid. The first, relatively large fluid flow resistance C1 of the first channel is caused by a relatively small diameter of the channel. In the shown embodiment, intermediate channels 676b and 676c have fluid flow resistances C1* and C1**, intermediate the large first fluid flow resistance C1 and the low second fluid flow resistance C2.

Figure 12:
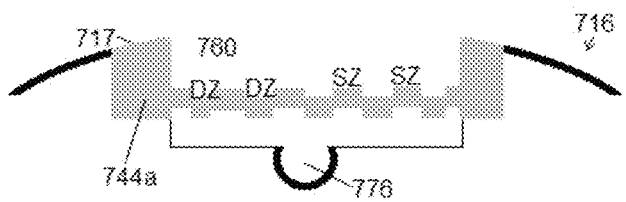
FIG. 12 schematically shows a cross section of part of a mould drum with a mould cavity according to another aspect of the present invention.

In FIG. 12, a part of a mould drum 716 is shown, having an outer surface 717. Schematically, a recessed mould cavity 760 is shown, defining the shape of the product which is to be moulded. This product will have a ribbed bottom. The mould drum has at least one permeable mould body 744 (not in figures) comprising an outer surface forming part of the outer mould member surface, a mould cavity 760 and a permeable volume 744a comprising fine openings opening out at the mould cavity 760. Further visible is part of a channel 776 providing communication from a not shown ejection fluid inlet to the permeable volume 744a.

According to an aspect of the invention, the mould cavity 760 comprises alternating deep zones DZ and relatively shallow zones SZ, relative to an imaginary curved plane of the opening of the mould cavity in the mould drum. The permeable volume 744a, preferably made of a porous material, e.g. sintered metal, delimiting the mould cavity has a constant thickness between the mould cavity 760 and the channel 776. So, the side of the permeable volume has an inlet face that is exposed to the one or more channels that, seen in cross-sections, is generally parallel to the outlet face of the permeable volume which defines the deep and shallow zones. Or in other terms the shape of the inlet side of the permeable volume mimics the outlet side (and product shape determining side) of the permeable volume. This approach may allow to provide, e.g. when porosity is substantially homogenous, an essentially uniform fluid flow resistance for the flow of pressurized ejection fluid through the permeable body, e.g. achieving a uniform distribution of ejection fluid over the interface between the product and the mould cavity. This design may be advantageous for moulding ribbed food products, e.g. with substantial height ribs. For example, ribbed products having multiple parallel ribs at least on one side thereof, e.g. as known from U.S. Pat. No. 4,418,446, can advantageously be made.

Figure 13:
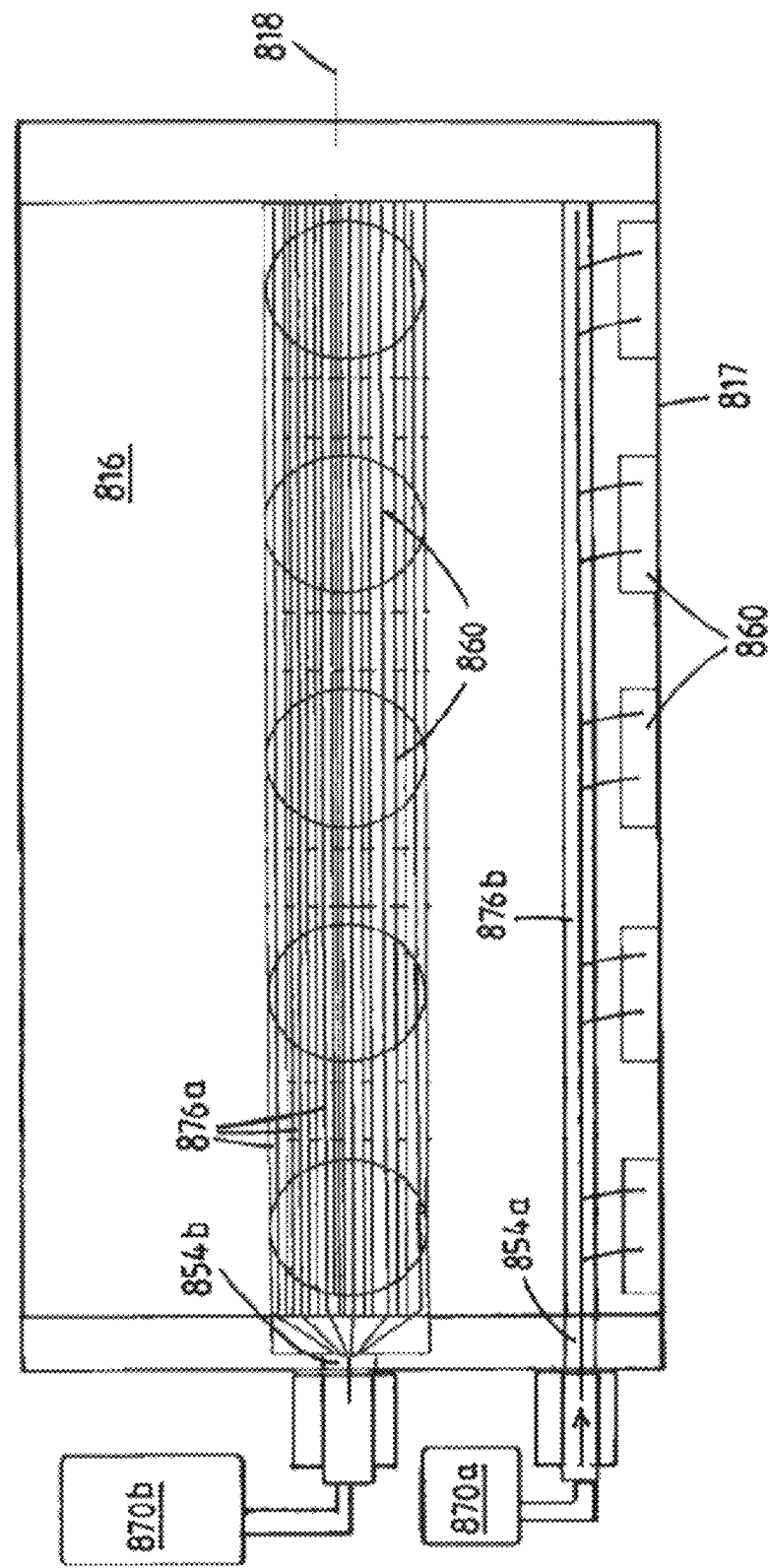
FIG. 13 schematically shows a side view and cross section of a mould drum with mould cavities according to an aspect of the present invention.

In FIG. 13 details of a rotatable mould drum 816 are shown partially in cross section and in a side view. The rotatable mould drum 816 is configured for use in an installation for moulding food products from a pumpable foodstuff mass. The mould drum has an outer surface 817 and a longitudinal axis 818. In operation the mould drum is rotatably supported to rotate in a rotation direction.

The mould member has in the outer surface multiple recessed mould cavities 860, each mould cavity defining a shape of the product which is to be moulded, the mould cavities each having an opening in the outer mould member surface 817 for the introduction of foodstuff mass into the mould cavity and for the ejection of the moulded product. The mould member has at least one permeable mould body, not shown in detail, comprising:
 an outer surface forming at least part of the outer mould member surface, which outer surface of the permeable mould body is fluid tight;
 one or more of the mould cavities,
 a permeable volume comprising fine openings opening out at the one or more mould cavities,
such that each mould cavity of the permeable mould body is delimited at least in part by a permeable volume.

The mould member further comprises, for each group of mould cavities from which moulded food products are to be ejected simultaneously:
 an ejection fluid inlet 854a, 854b,
 multiple channels 876a, 876b extending from each associated ejection fluid inlet 854a, 854b to the one or more permeable volumes of the group of mould cavities,
the channels providing communication from the at least one ejection fluid inlet via the channels and via the permeable volumes into the mould cavities to assist in ejection of the moulded products from the group of mould cavities.

In the direction of movement of the mould member, preferably between a position in which foodstuff mass is introduced into the mould cavity and a position of ejection of the moulded product, the at least one ejection fluid inlet allows, and is used for, the entry of a first or pre-treatment fluid into the channel(s), possibly into the permeable volume(s), and possibly into the mould cavities, In FIG. 13 the ejection fluid inlet 854b is at this intermediate position, while the ejection fluid inlet 854a is at the position of ejection of the moulded product. The ejection fluid inlet 854a allows the entry of a pressurized ejection fluid from a fluid source 870a enabling the ejection of the moulded products from the group of mould cavities. The ejection fluid inlet 854b at the intermediate position allows the entry of a first or pre-treatment fluid such as water, preferably at a non-releasing initial pressure, from another fluid source 870b.

Figure 14:
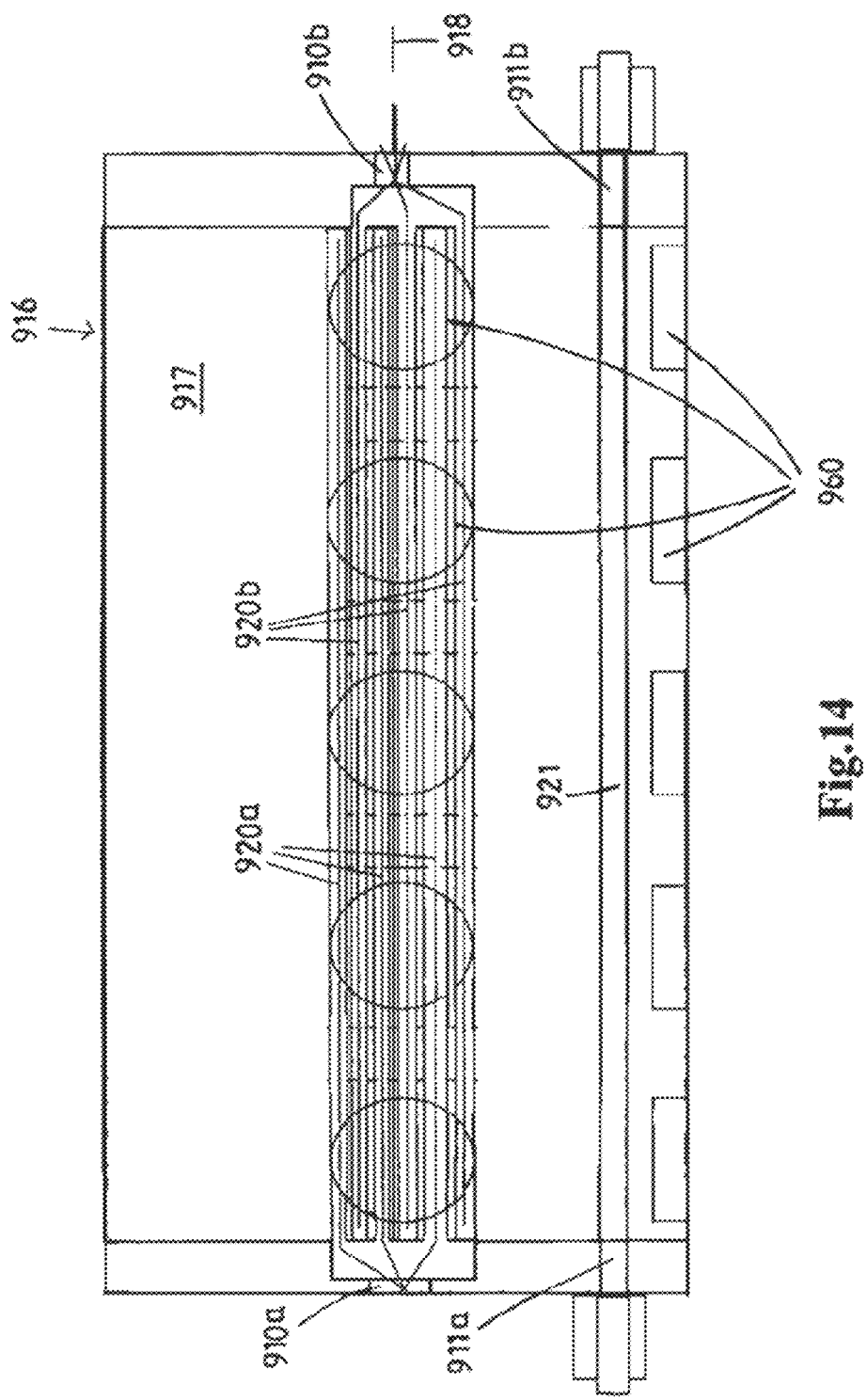
FIG. 14 schematically shows a side view and cross section of a mould drum with mould cavities according to another aspect of the present invention.

In FIG. 14 details of a rotatable mould drum 916 are shown partially in cross section and in a side view. The rotatable mould drum 916 is configured for use in an installation for moulding food products from a pumpable foodstuff mass. The mould drum has an outer surface 917 and a longitudinal axis 918. In operation the mould drum is rotatably supported to rotate in a rotation direction.

The mould drum has in the drum surface multiple recessed mould cavities 960, each mould cavity defining a shape of the product which is to be moulded. The mould cavities each have an opening in the drum surface for the introduction of foodstuff mass into the mould cavity and for the ejection of the moulded product.

The mould drum has at least one permeable mould body, not shown in detail, comprising:
 a curved outer surface forming at least part of the outer circumferential drum surface, which curved outer surface of the permeable mould body is fluid tight;
 one or more of the mould cavities,
 a permeable volume comprising fine openings opening out at the one or more mould cavities,
such that each mould cavity of the permeable mould body is delimited at least in part by a permeable volume.

The rotary cylindrical mould drum further comprises, for each group of mould cavities from which food products are to be ejected simultaneously:
 at least two ejection fluid inlets 910a, 910b; 911a, 911b provided at opposite sides of the drum, each allowing the entry of pressurized fluid;
 one or more channels 920a, 920b; 921 extending from an associated ejection fluid inlet to the one or more permeable volumes of the group of mould cavities.

In the figures, channels 920a extend from fluid inlet 910a, and channels 920b extend from fluid inlet 910b. For the other group of mould cavities from which food products are to be ejected simultaneously the two ejection fluid inlets 911a, 911b are shown. The associated channels are not shown in detail but together labelled channel 921.

The channels provide communication from the at least one ejection fluid inlet via the channels and via the permeable volumes into the mould cavities to assist in ejection of the moulded products from the group of mould cavities.

The configuration of the at least two ejection fluid inlets, associated channel(s), permeable volume(s) and group of mould cavities from which food products are to be ejected simultaneously is such that
channels 920a associated with fluid inlet 910a at one side of the drum are alternated by channels 920b associated with at fluid inlet 910b at the opposed side of the drum. As a consequence, mould cavities which are 'nearest' to ejection fluid inlet 910a, are 'furthest' from the opposed ejection fluid inlet, thereby at least partly compensating for the decrease in volumetric flow rate over the length of a fluid channel, to have more efficient use of ejection fluid.

Figure 15:
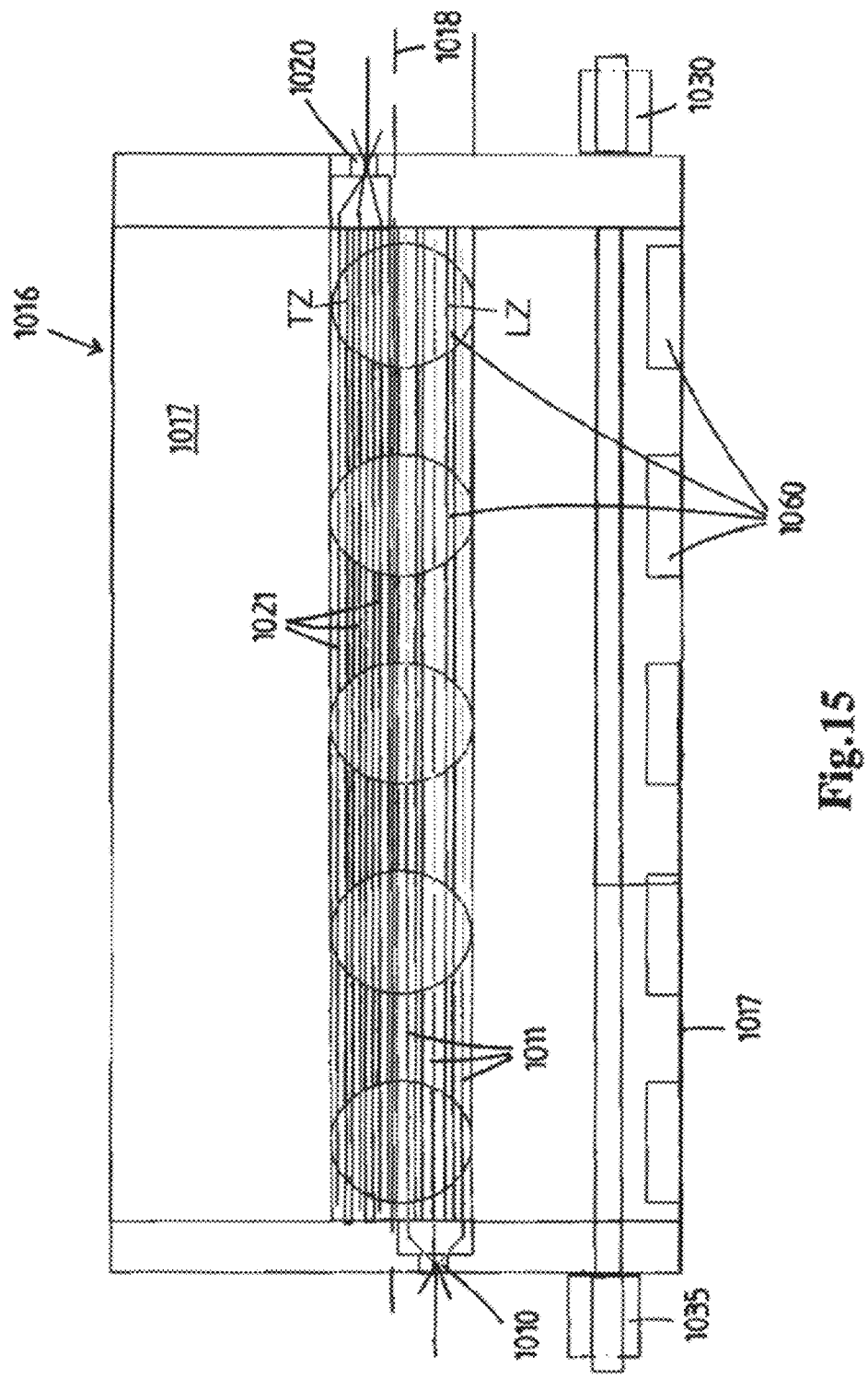
FIG. 15 schematically shows a side view and cross section of a mould drum with mould cavities according to another aspect of the present invention.

In FIG. 15 details of a rotatable mould drum 1016 are shown partially in cross section and in a side view. The rotatable mould drum 1016 is configured for use in an installation for moulding food products from a pumpable foodstuff mass. The mould drum has an outer surface 1017 and a longitudinal axis 1018. In operation the mould drum is rotatably supported to rotate in a rotation direction.

The mould drum has in the drum surface multiple recessed mould cavities 1060, each mould cavity defining a shape of the product which is to be moulded. The mould cavities each have an opening in the drum surface for the introduction of foodstuff mass into the mould cavity and for the ejection of the moulded product.

The mould drum has at least one permeable mould body, not shown in detail, comprising:
 a curved outer surface forming at least part of the outer circumferential drum surface, which curved outer surface of the permeable mould body is fluid tight;

one or more of the mould cavities,
a permeable volume comprising fine openings opening out at the one or more mould cavities,
such that each mould cavity of the permeable mould body is delimited at least in part by a permeable volume.

The mould member further comprises, for each group of mould cavities from which moulded food products are to be ejected simultaneously:
at least one first ejection fluid inlet 1010, allowing the entry of ejection fluid from a fluid source 1035, and
at least one second ejection fluid inlet 1020, allowing the entry of ejection fluid from a second fluid source 1030, and
one or more channels 1011 associated with the at least one first ejection fluid inlet 1010 extending from the at least one first ejection fluid inlet to the one or more permeable volumes of the group of mould cavities,
one or more channels 1021 associated with the at least one second ejection fluid inlet 1020 extending from the at least one second ejection fluid inlet 1020 to the one or more permeable volumes of the group of mould cavities.

The channels 1011 provide communication from the associated ejection fluid inlet 1010 via the channels and via the permeable volumes into the mould cavities to assist in ejection of the moulded products from the group of mould cavities, as do the channels 1021 from the associated second ejection fluid inlet 1020.

The configuration of the at least one first ejection fluid inlet 1010, the at least one second ejection fluid inlet 1020, associated channels 1011 and 1021 respectively, permeable volume(s) and group of mould cavities which are to be ejected simultaneously is such that
channels 1011 extending from the associated at least one first ejection fluid inlet 1010 to a mould cavity allow a first flow of ejection fluid, which is separate from a second fluid flow of ejection fluid in channels 1021 extending from the associated at least one second ejection fluid inlet 1020 to the same one mould cavity. As the separate flows originate from different fluid sources 1035, 1030, the flows can differ e.g. in pressure, temperature and/or composition.

In the embodiment shown in FIG. 15, channels 1011 extending from the associated at least one first ejection fluid inlet 1010 extend to a leading zone LZ of the one mould cavity, and channels 1021 extending from the associated at least one second ejection fluid inlet 1020 into a trailing zone TZ of the same one mould cavity, seen in the direction of movement (M). This allows the entry of ejection fluid with an increased pressure via first ejection fluid inlet 1010, compared to the entry of ejection fluid with a lower pressure via second ejection fluid inlet 1020.

Figure 16:
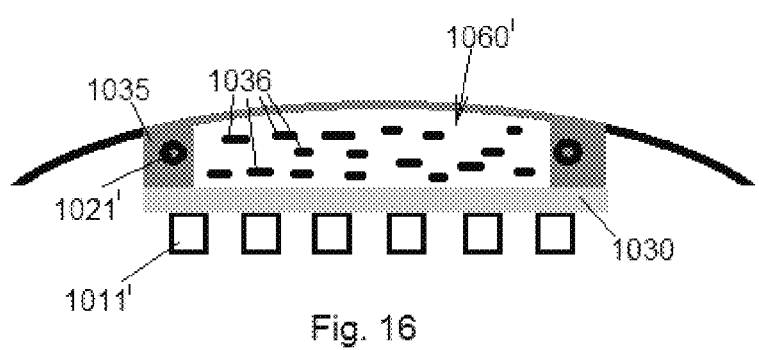
FIG. 16 schematically shows a cross section of part of a mould drum with a mould cavity according to an aspect of the present invention.

In FIG. 16, an alternative configuration of a mould cavity 1060' is shown. Here, channels 1011' (similar to channels 1011 in FIG. 15) extend from the associated at least one first ejection fluid inlet (not shown) to a porous volume 1030 provided at a bottom part of the mould cavity 1060' Channels 1021', similar to channels 1021 in FIG. 15, extend from the associated at least one second ejection fluid inlet (not shown) into a peripheral wall zone 1035 of the same one mould cavity 1060'. The peripheral wall zone 1035 is provided with fluid discharge ports 1036.

This configuration of FIG. 16 allows the entry of distinct ejection fluids via the first and second ejection fluid inlets. For example, pressurized air may be entered via first ejection fluid inlet and channels 1011' into the bottom of the mould cavity, and the entry of water is allowed via second ejection fluid inlet and second ejection fluid channels 1021', into the peripheral wall of the mould cavity 1060'. Such a configuration is e.g. advantageous for products that cramped between the peripheral walls, more than that they are stuck to the mould cavity wall.

The invention claimed is:

1. A moveable mould member configured for use in an installation for moulding food products from a pumpable foodstuff mass, the mould member having an outer surface, in operation the mould member being movably supported to move in a direction of movement,
wherein the mould member is a rotary mould drum having an outer circumferential drum surface, defined as the outer surface, and a longitudinal drum rotation axis, in operation the drum being rotatably supported in the installation to revolve about the drum rotation axis in a direction of rotation defined as the direction of movement,
wherein the mould member has, in the outer surface, multiple recessed mould cavities, each mould cavity defining a shape of the product which is to be moulded, the mould cavities each having an opening in the outer mould member surface for introduction of foodstuff mass into the mould cavity and for ejection of the moulded product, the mould member having at least one permeable mould body comprising:
an outer surface forming at least part of the outer surface of the mould member, which outer surface of the permeable mould body is fluid tight;
one or more of the mould cavities,
a permeable volume comprising fine openings opening out at the one or more mould cavities,
such that each mould cavity of the permeable mould body is delimited at least in part by a permeable volume,
the mould member further comprising, for each group of mould cavities from which moulded food products are to be ejected simultaneously:
at least one ejection fluid inlet allowing entry of pressurized fluid,
one or more channels extending from the at least one associated ejection fluid inlet to the one or more permeable volumes of the group of mould cavities, and
the one or more channels providing communication from the at least one associated ejection fluid inlet via the channels and via the permeable volumes into the mould cavities to assist in ejection of the moulded products from the group of mould cavities,
wherein the permeable volume delimiting a mould cavity has a first fluid flow resistance P1 for a flow of ejection fluid into a trailing zone of the cavity, which is different from a second fluid flow resistance P2 for a flow of ejection fluid into a leading zone of the same one mould cavity, seen in the direction of movement, the first fluid flow resistance P1 being larger than the second fluid flow resistance P2.

2. The mould member according to claim 1, wherein the first fluid flow resistance P1 of the permeable volume is caused by:
a relatively low porosity; and/or
a relatively high pore density of the permeable volume, and/or
a relatively large thickness of the permeable volume, between the one or more channels and the mould cavity.

3. The mould member according to claim 1, wherein the permeable volume comprises distinct components, e.g. of distinct materials, each having a respective one of said first and second fluid flow resistance.

4. A method for moulding of food products from a pumpable foodstuff mass,
- wherein use is made of an installation for moulding food products from a pumpable foodstuff mass comprising a moveable mould member having an outer surface, in operation the mould member being moved in a direction of movement,
- wherein the mould member is a rotary mould drum having an outer circumferential drum surface, defined as the outer surface, and a longitudinal drum rotation axis, in operation the drum revolving about the drum rotation axis in a direction of rotation defined as the direction of movement,
- wherein the mould member has, in the outer surface, multiple recessed mould cavities, each mould cavity defining a shape of the product, which is to be moulded, the mould cavities each having an opening in the outer mould member surface for introduction of foodstuff mass into the mould cavity and for ejection of the moulded product, the mould member having at least one permeable mould body comprising:
  - an outer surface forming at least part of the outer mould member surface, which outer surface of the permeable mould body is fluid tight;
  - one or more of the mould cavities,
  - a permeable volume comprising fine openings opening out at the one or more mould cavities,
  - such that each mould cavity of the permeable mould body is delimited at least in part by a permeable volume,
- the mould member further comprising, for each group of mould cavities from which food products are to be ejected simultaneously:
  - at least one ejection fluid inlet allowing entry of pressurized fluid,
  - one or more channels extending from the at least one associated ejection fluid inlet to the one or more permeable volumes of the group of mould cavities, and
  - the one or more channels providing communication from the at least one associated ejection fluid inlet via the channels and via the permeable volumes into the mould cavities to assist in ejection of the moulded products from the group of mould cavities,
- wherein, a position of the mould member in which foodstuff mass is introduced into the mould cavity and another position of the mould member where ejection of the moulded product takes place, a first fluid, comprising a pre-treatment fluid is entered into the one or more channels, said first fluid being introduced via the at least one ejection fluid inlet, said first fluid being water, and
- wherein at the position of ejection of the moulded product, an ejection fluid comprising compressed air is entered into the at least one ejection fluid inlet, said ejection fluid assisting the ejection of the moulded products from the group of mould cavities;
- wherein the permeable volume delimiting a mould cavity has a first fluid flow resistance P1 for a flow of ejection fluid into a trailing zone of the cavity, which is different from a second fluid flow resistance P2 for a flow of ejection fluid into a leading zone of the same one mould cavity, seen in the direction of movement, the first fluid flow resistance P1 being larger than the second fluid flow resistance P2.

5. A moulding installation for moulding food products from a pumpable foodstuff mass, which installation comprises:
- a frame,
- a mould member according to claim 1, being movably supported by the frame,
- a mould member drive which, in operation, is coupled to the mould member to drive the mould member in a direction of movement,
- a mass feed member which, in operation, is arranged at a fill position relative to the mould member surface, said mass feed member being adapted to transfer mass into passing mould cavities of the movable mould member, said mass forming a food product in said mould cavity,
- an ejection fluid source arranged at a location to communicate with a passing ejection fluid inlet and configured to enter ejection fluid into said inlet.

\* \* \* \* \*